(12) United States Patent
Kim et al.

(10) Patent No.: US 11,223,761 B2
(45) Date of Patent: Jan. 11, 2022

(54) ELECTRONIC DEVICE FOR OBTAINING IMAGES BY CONTROLLING FRAME RATE FOR EXTERNAL MOVING OBJECT THROUGH POINT OF INTEREST, AND OPERATING METHOD THEREOF

(71) Applicant: Samsung Electronics Co., Ltd., Suwon-si (KR)

(72) Inventors: Junghyung Kim, Suwon-si (KR); Jaehyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/539,422

(22) Filed: Aug. 13, 2019

(65) Prior Publication Data

US 2020/0077019 A1 Mar. 5, 2020

(30) Foreign Application Priority Data

Sep. 4, 2018 (KR) .................. 10-2018-0105372

(51) Int. Cl.
*H04N 5/225* (2006.01)
*H04N 5/232* (2006.01)
(Continued)

(52) U.S. Cl.
CPC ......... *H04N 5/23232* (2013.01); *G06T 7/292* (2017.01); *H04N 5/247* (2013.01)

(58) Field of Classification Search
CPC ......... H04N 5/23293; H04N 5/232945; H04N 5/247; H04N 5/2258; H04N 5/232127;
(Continued)

(56) References Cited

U.S. PATENT DOCUMENTS

| 5,200,828 A | 4/1993 | Jang et al. |
|---|---|---|
| 7,974,529 B2 | 7/2011 | Koguchi et al. |

(Continued)

FOREIGN PATENT DOCUMENTS

| DK | 177695 B1 | 3/2014 |
|---|---|---|
| EP | 1 107 610 A1 | 6/2001 |

(Continued)

OTHER PUBLICATIONS

European Search Report dated Nov. 28, 2019, issued in European Patent Application No. 19194677.1.
(Continued)

*Primary Examiner* — Masum Billah
(74) *Attorney, Agent, or Firm* — Jefferson IP Law, LLP

(57) ABSTRACT

An electronic device for obtaining a plurality of images by controlling a frame rate, and an operating method thereof is provided. The electronic device includes at least one camera, a memory, and a processor. The processor is configured to set a first point of interest and a second point of interest related to a moving image to be generated by using the camera, obtain a plurality of first images according to a first frame rate by using the camera, identify, through the first point of interest and the second point of interest by using at least a part of the plurality of first images, an external object that is being moved, in response to a motion of the external object through the first point of interest, obtain a plurality of second images regarding the external object according to a second frame rate by using the camera, in response to a motion of the external object through the second point of interest, obtain a plurality of third images regarding the external object according to the second frame rate or a third frame rate by using the camera, and generate the moving image including the plurality of first images, the plurality of second images, and the plurality of third images.

20 Claims, 22 Drawing Sheets

(51) Int. Cl.
*H04N 5/247* (2006.01)
*G06T 7/292* (2017.01)

(58) Field of Classification Search
CPC ........... H04N 5/23216; H04N 5/23222; H04N 5/23245
USPC ....................................................... 348/169
See application file for complete search history.

(56) References Cited

U.S. PATENT DOCUMENTS

| | | | |
|---|---|---|---|
| 10,115,204 B2 | 10/2018 | Lee et al. | |
| 10,419,658 B1 * | 9/2019 | Haynold | ............ H04N 5/23222 |
| 2005/0200749 A1 | 9/2005 | Lee et al. | |
| 2009/0295931 A1 * | 12/2009 | Cho | ...................... H04N 5/2257 348/220.1 |
| 2015/0103004 A1 * | 4/2015 | Cohen | ................. G06F 3/04842 345/158 |
| 2015/0169964 A1 * | 6/2015 | Finn | ................. G08B 13/19652 382/103 |
| 2015/0256749 A1 | 9/2015 | Frey et al. | |
| 2017/0034449 A1 * | 2/2017 | Eum | ..................... H04N 5/2258 |

FOREIGN PATENT DOCUMENTS

| | | |
|---|---|---|
| GB | 2503481 A | 1/2014 |
| KR | 1992-0007614 B1 | 9/1992 |
| KR | 1994-0007992 B1 | 8/1994 |
| KR | 10-2001-0072430 A | 7/2001 |
| KR | 10-2004-0007730 A | 1/2004 |
| KR | 10-2004-0010726 A | 1/2004 |
| KR | 10-0508320 B1 | 8/2005 |
| KR | 10-2005-0090793 A | 9/2005 |
| KR | 10-0595084 B1 | 6/2006 |
| KR | 10-2007-0081456 A | 8/2007 |
| KR | 10-1215058 B1 | 12/2012 |
| KR | 10-1438189 B1 | 9/2014 |
| KR | 10-1540771 B1 | 8/2015 |
| KR | 10-2017-0082331 A | 7/2017 |
| KR | 10-1809613 B1 | 1/2018 |
| WO | 00/16544 A2 | 3/2000 |
| WO | 01/61480 A1 | 8/2001 |
| WO | 2008/136007 A2 | 11/2008 |
| WO | 2015/067750 A1 | 5/2015 |
| WO | WO-2015067750 A1 * | 5/2015 ........... H04N 5/2353 |

OTHER PUBLICATIONS

European Office Action dated Jul. 9, 2020, issued in European Application No. 19194677.1.
European Office Action dated Mar. 11, 2021, issued in European Patent Application No. 19 194 677.1.

* cited by examiner

ELECTRONIC DEVICE FOR OBTAINING IMAGES BY CONTROLLING FRAME RATE FOR EXTERNAL MOVING OBJECT THROUGH POINT OF INTEREST, AND OPERATING METHOD THEREOF

CROSS-REFERENCE TO RELATED APPLICATION(S)

This application is based on and claims priority under 35 U.S.C. § 119(a) of a Korean patent application number 10-2018-0105372, filed on Sep. 4, 2018, in the Korean Intellectual Property Office, the disclosure of which is incorporated by reference herein in its entirety.

BACKGROUND

1. Field

The disclosure relates to an electronic device for obtaining a plurality of images by controlling a frame rate, and an operating method thereof.

2. Description of Related Art

Electronic devices (e.g., mobile terminals, smartphones, wearable devices, or the like) may provide various functions. For example, a smartphone may provide a short range wireless communication (e.g., Bluetooth, Wi-Fi, near field communication (NFC), or the like) function, a mobile communication ($3^{rd}$ generation (3G), 4th generation (4G), 5th generation (5G), or the like) function, a music or video replay function, a photographing or moving image shooting function, or a navigation function, in addition to a basic voice communication function.

In general, an electronic device can shoot a moving image at a speed of 30 frame per second (fps). As a transfer rate between an image sensor to obtain images in the electronic device and a memory to store images obtained from the image sensor is enhanced in recent years, the electronic device can store more image frames in the memory than an existing one for a specific time. Accordingly, electronic devices provide a function of shooting at a higher frame rate (for example, 960 fps) than 30 fps.

The above information is presented as background information only to assist with an understanding of the disclosure. No determination has been made, and no assertion is made, as to whether any of the above might be applicable as prior art with regard to the disclosure.

SUMMARY

An electronic device may provide a method for shooting an external object at high speed by using one point of interest (or region of interest). However, when one point of interest is used in the electronic device, the electronic device may fail to detect a motion of the external object to be shot through one point of interest, and may not perform high-speed shooting. In addition, when one point of interest is used in the electronic device, an externa object other than the external object that a user wishes to shoot is detected through one point of interest, and thus the electronic device may shoot the external object that the user does not intend to shoot at high speed.

Aspects of the disclosure are to address at least the above-mentioned problems and/or disadvantages and to provide at least the advantages described below. Accordingly, an aspect of the disclosure is to provide a method and an apparatus for automatically detecting at least one external object based on at least one point of interest, and shooting the object at high speed in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes at least one camera, a memory, and a processor. The processor may be configured to set a first point of interest and a second point of interest related to a moving image to be generated by using the at least one camera, obtain a plurality of first images according to a first frame rate by using the at least one camera, identify, through the first point of interest and the second point of interest by using at least a part of the plurality of first images, at least one external object that is moving, in response to a motion of the at least one external object through the first point of interest, obtain a plurality of second images regarding the at least one external object according to a second frame rate higher than the first frame rate by using the at least one camera, in response to a motion of the at least one external object through the second point of interest, obtain a plurality of third images regarding the at least one external object according to the second frame rate or a third frame rate higher than the first frame rate by using the at least one camera, and, as a part of the moving image, generate the moving image including at least one of a first section generated by using at least a part of the plurality of first images, a second section generated by using the plurality of second images, or a third section generated by using the plurality of third images.

In accordance with another aspect of the disclosure, a method of an electronic device is provided. The method includes setting a first point of interest and a second point of interest related to a moving image to be generated by using at least one camera, obtaining a plurality of first images according to a first frame rate by using the at least one camera, identifying, through the first point of interest and the second point of interest by using at least a part of the plurality of first images, at least one external object that is moving, in response to a motion of the at least one external object through the first point of interest, obtaining a plurality of second images regarding the at least one external object according to a second frame rate higher than the first frame rate by using the at least one camera, in response to a motion of the at least one external object through the second point of interest, obtaining a plurality of third images regarding the at least one external object according to the second frame rate or a third frame rate higher than the first frame rate by using the at least one camera, and as a part of the moving image, generating the moving image including at least one of a first section generated by using at least a part of the plurality of first images, a second section generated by using the plurality of second images, or a third section generated by using the plurality of third images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
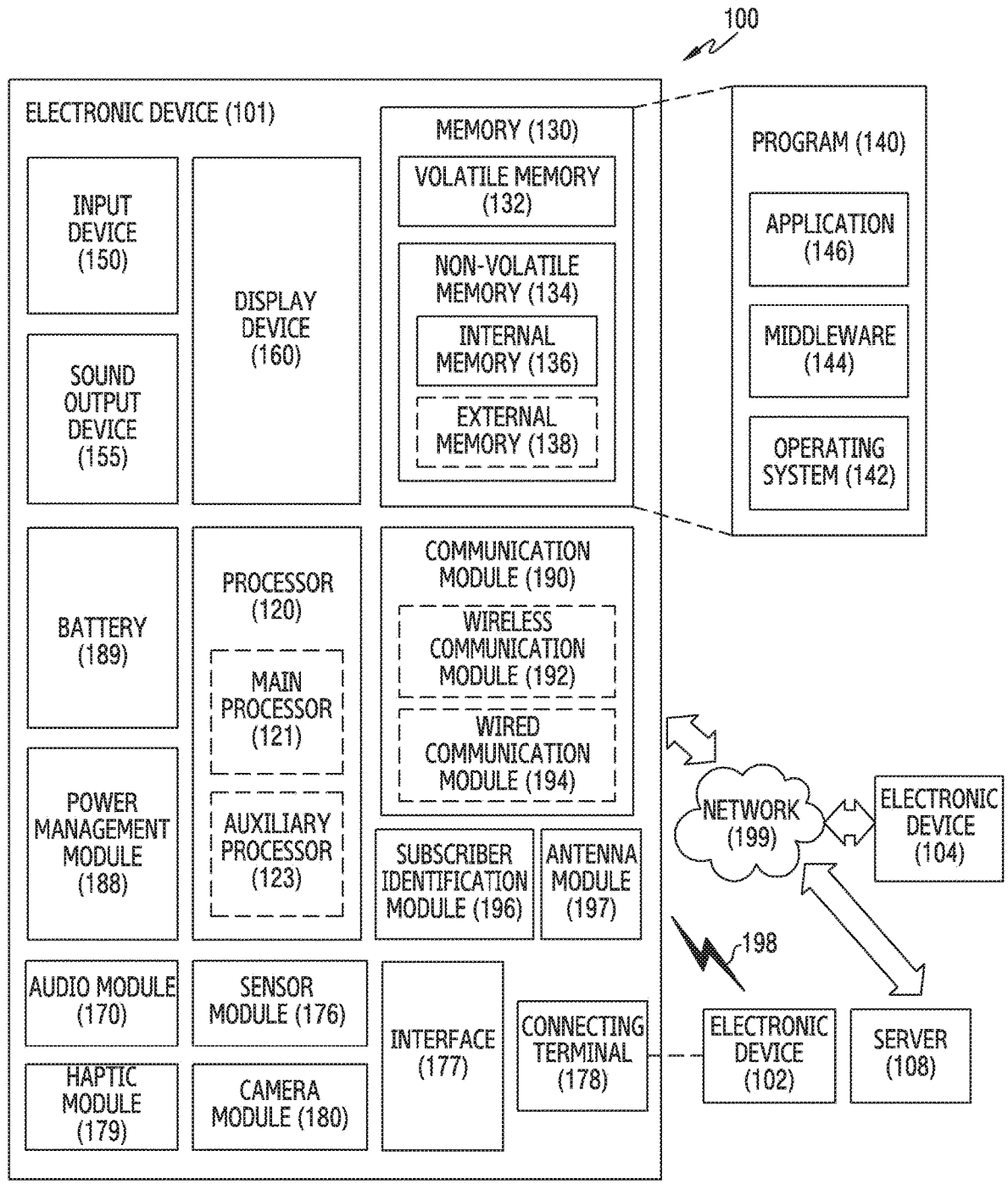
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134, and may further include internal memory 136 and external memory 138.

The program 140 may be stored in the memory 130 as software, and may include, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
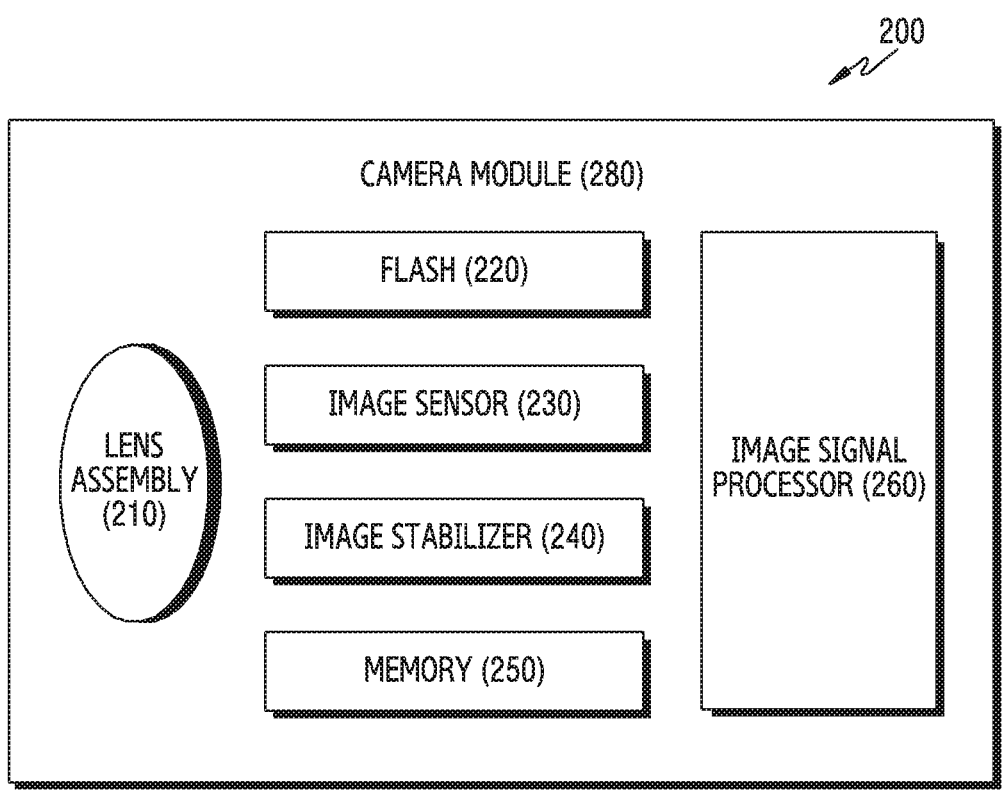
FIG. 2 is a block diagram illustrating a camera module according to an embodiment of the disclosure.

FIG. 2 is a block diagram 200 illustrating the camera module according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. The camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor (not shown) or an acceleration sensor (not shown) disposed inside or outside the camera module 180. The image stabilizer 240 may be implemented as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260.

The memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. The image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

The electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The processor 120 may perform high-speed shooting by controlling the camera module 180 based on at least one point of interest (or region of interest). The high-speed shooting may refer to shooting according to a high frame rate which is higher than a first frame rate that is a default shooting speed. For example, the high-speed shooting may refer to obtaining a plurality of images at a second frame rate which is higher than the first frame rate. The first rate may be about 30 frames per second (fps), and the second frame rate may be about 960 fps. This is merely an example, and the first frame rate and/or the second frame rate may be set to different values by a designer and/or a user. The high-speed shooting may include super slow motion shooting. The at least one point of interest may be set based on a user input or may be automatically set according to a point-of-interest setting mode.

The point-of-interest setting mode may be determined by a user input or may be determined based on a result of image analysis. For example, the processor 120 may detect a user input to set a point of interest in a preview state in which the camera module 180 is driven, and may set at least one point of interest based on a position where the user input is detected. In another example, the processor 120 may detect a user request to set a point of interest in the preview state, and may control the display device 160 to display a list including point-of-interest setting modes in response to the user request. The processor 120 may set at least one point of interest based on a point-of-interest setting mode selected by a user input from the displayed point-of-interest setting modes. The processor 120 may analyze images obtained in the preview state, may determine a point-of-interest setting mode based on the result of image analysis, and may set at least one point of interest based on the determined point-of-interest setting mode.

The point-of-interest setting modes may be set based on at least one of a subject, a type of the subject, a motion-estimated path of the subject, a motion speed of the subject, or a type of exercise. For example, the point-of-interest setting modes may include at least one of a point-of-interest setting mode according to a subject type (e.g., a shooting star mode, an insect mode), a point-of-interest setting mode for shooting a subject performing specific exercise (e.g., a golf mode, a skate board mode, a swimming mode), or a point-of-interest setting mode for shooting a subject moving through a designated path (e.g., a specific ride mode). This is merely an example, and various embodiments of the disclosure are not limited thereto. At least one point of interest corresponding to each point-of-interest setting mode may be set and/or changed by a designer and/or a user. The processor 120 may control the display (e.g., the display device 160 of FIG. 1) to display at least one point of interest within a preview screen. At least one of the number, size, shape, color, luminance, or transparency of the at least one point of interest may be changed based on a user input. At least one of the number, size, shape, color, luminance, or transparency of the at least one point of interest may be determined according to a point-of-interest setting mode. For example, a size of at least one point of interest corresponding to a first point-of-interest setting mode may be smaller than a size of at least one point of interest corresponding to a second point-of-interest setting mode. In another example, the number of points of interest corresponding to the first point-of-interest setting mode may be 3, and the number of points of interest corresponding to the second point-of-interest setting mode may be 2.

The processor 120 may monitor at least one point of interest and may identify whether at least one first designated condition is satisfied, and, when the at least one first designated condition is satisfied through the at least one interest of point, the processor 120 may control the camera module 180 to perform high-speed shooting. The at least one first designated condition may include at least one of, for example, detection of a motion of at least one external object or subject, detection of a designated color, detection of a designated image (e.g., a face image, an image of a smiling face), detection of a designated shape (e.g., an animal shape, a person shape, a shape of a thing), or detection of a designated type of object. For example, when a motion of at least one external object is detected through at least one point of interest, the processor 120 may control the camera module 180 to perform high-speed shooting. In another example, when at least one designated image is detected through at least one point of interest, the processor 120 may control the camera module 180 to perform high-speed shooting.

The processor 120 may detect a moving image shooting trigger event in the preview state, and, in response to the moving image shooting trigger event being detected, may control the camera module 180 to perform default shooting to obtain a plurality of images according to the first frame rate. The moving image shooting trigger event may be detected based on at least one of a designated subject movement path or a designated moving image shooting trigger region. For example, the processor 120 may monitor a start position (or a start point, a start region) of the designated subject movement path or the designated moving image shooting trigger region in the preview state, and may determine whether at least one second designated condition is satisfied, and, when the at least one second designated condition is satisfied through the start position of the designated subject movement path or the designated moving image shooting trigger region, the processor 120 may control the camera module 180 to perform default shooting according to the first frame rate.

The at least one second designated condition may include at least one of, for example, detection of a motion of at least one external object or subject, detection of a designated color, detection of a designated image (e.g., a face image, an image of a smiling face), detection of a designated shape (e.g., an animal shape, a person shape, a shape of a thing), or detection of a designated type of object. The second designated condition may be set the same as the first designated condition, or may be set to be different therefrom. For example, when a motion of at least one external object is detected through the start position of the designated subject movement path in the preview state, the processor 120 may determine that the moving image shooting trigger event occurs, and may control the camera module 180 to perform default shooting according to the first frame rate. In another example, when a motion of at least one external object is detected through the designated moving image shooting trigger region in the preview state, the processor 120 may determine that the moving image shooting trigger event occurs, and may control the camera module 180 to perform default shooting according to the first frame rate.

The subject movement path or the moving image shooting trigger region may be set along with a plurality of points of interest. For example, the processor 120 may set (or designate) the subject movement path or the moving image shooting trigger region while setting at least one point of interest based on a detected user input. In another example, the processor 120 may set at least one point of interest according to a point-of-interest setting mode selected by a user input, and simultaneously, may set a subject movement path or a moving image shooting trigger region corresponding to the selected point-of-interest setting mode. The processor 120 may control the display (e.g., the display device 160 of FIG. 1) to display a subject movement path and a plurality of points of interest, or a moving image shooting trigger region and a plurality of points of interest. At least one of the number, length, width, shape, color, luminance or transparency of the subject movement path may be changed based on a user input. At least one of the number, length, width, shape, color, luminance, or transparency of the subject movement path may be determined according to a point-of-interest setting mode. For example, a length of a subject movement path corresponding to the first point-of-interest setting mode may be shorter than a length of a subject movement path corresponding to the second point-of-interest setting mode. In another example, the number of subject movement paths corresponding to the first point-of-interest setting mode may be 2, and the number of subject movement paths corresponding to the second point-of-interest setting mode may be 1. At least one of the number, size, shape, color, luminance, or transparency of the moving image shooting trigger region may be changed based on a user input. At least one of the number, size, shape, color, luminance or transparency of the moving image shooting trigger region may be determined according to a point-of-interest setting mode. For example, a size of a moving image shooting trigger region corresponding to the first point-of-interest setting mode may be smaller than a size of a moving image shooting trigger region corresponding to the second point-of-interest setting mode. In another example, the number of moving image shooting trigger regions corresponding to the first point-of-interest setting mode may be 1, and the number of moving image shooting trigger regions corresponding to the second point-of-interest setting mode may be 0.

The processor 120 may set the subject movement path or the moving image shooting trigger region by using a preview screen corresponding to at least one camera among the plurality of cameras included in the camera module 180. For example, the processor 120 may control the camera module 180 and the display device 160 to display a preview screen corresponding to a first camera among the plurality of cameras, and may set at least one moving image trigger region and at least one point of interest in the preview screen corresponding to the first camera. In another example, the processor 120 may control the camera module 180 and the display device 160 to display the preview screen corresponding to the first camera among the plurality of cameras, and may set a subject movement path and at least one point of interest in the preview screen corresponding to the first camera. The at least one point of interest may be set to overlap the subject movement path at least in part. In another example, the processor 120 may control the camera module 180 and the display device 160 to display preview screens corresponding to the plurality of cameras, and may set at least one moving image shooting trigger region in the preview screen corresponding to the first camera, and may set at least one point of interest in a preview screen corresponding to a second camera. In another example, the processor 120 may control the camera module 180 and the display device 160 to display preview screens corresponding to the plurality of cameras, and may set at least one moving image shooting trigger region and at least one point of interest in the preview screen corresponding to the first camera among the preview screens, and may set at least one point of interest in the preview screen corresponding to the second camera.

The preview screen corresponding to the first camera may overlap at least a part of the preview screen corresponding to the second camera, or may not overlap the preview screen corresponding to the second camera. For example, when the first camera is a camera that faces in the same direction as the direction of the second camera and has an angle of view larger than that of the second camera, the preview screen corresponding to the first camera may be configured to include a wider region than the preview screen corresponding to the second camera. In another example, when the first camera faces in a different direction from that of the second camera, the preview screen corresponding to the first camera and the preview screen corresponding to the second camera may be configured to include regions that do not overlap each other.

The processor 120 may perform high-speed shooting based on at least one of a monitoring order, a monitoring method, or the number of times of detection of at least one point of interest. For example, the processor 120 may determine at least one of the monitoring order, the monitoring method, and/or the number of times of detection of at least one point of interest, based on at least one of a user input, a corresponding point-of-interest setting mode, or a designated subject movement path. The processor 120 may select at least one point of interest as a region to be monitored, based on at least one of the monitoring order, the monitoring method, or the number of times of detection of at least one point of interest. The processor 120 may monitor the selected at least one point of interest, and may identify whether at least one first designated condition is satisfied through the selected at least one point of interest. When the at least one first designated condition is satisfied through the selected at least one point of interest, the processor 120 may control the camera module 180 to perform high-speed shooting according to the second frame rate. After performing high-speed shooting, the processor 120 may re-select the previously selected at least one point of interest as a region to be monitored, based on at least one of the monitoring order, the monitoring method, and/or the number of times of detection of at least one point of interest, or may select at least one other point of interest as a region to be monitored.

The monitoring orders of a plurality of points of interest may be set to be different from one another, and the orders of at least two points of interest among the plurality of points of interest may be set to be the same. For example, the monitoring order of a first point of interest among three points of interest may be set to 1, and the monitoring order of a second point of interest and the monitoring order of a third point of interest may be set to 2, respectively. The processor 120 may monitor a plurality of points of interest having the same order simultaneously. The monitoring orders of the plurality of points of interest may be set based on a designated subject movement path. The monitoring method of the plurality of points of interest may be set to a sequential detection method or an alternating detection method. The sequential detection method may be a method which monitors a plurality of points of interest in sequence according to their respective orders. The alternating detection method may be a method which alternately monitors a plurality of points of interest having the same order or a plurality of points of interest for which orders are not set. The number of times of detection of each of the at least one point of interest may refer to the number of times a designated condition is detected through a corresponding point of interest. When the number of times of detection of the first point of interest is set to 1 and the number of times of detection of the second point of interest is not set, the processor 120 may detect that the first designated condition is satisfied through the first point of interest one time, and may perform high-speed shooting, and then may not monitor the first point of interest and may monitor only the second point of interest.

The processor 120 may determine a high-speed shooting time regarding at least one point of interest. For example, when the at least one first designated condition is satisfied through the first point of interest, the processor 120 may determine a high-speed shooting time based on a physical size of the first point of interest. When the physical size of the first point of interest is larger than or equal to a designated size, the processor 120 may determine the high-speed shooting time to a first time (e.g., about 0.4 second), and, when the physical size of the first point of interest is smaller than the designated size, may determine the high-speed shooting time to a second time (for example, about 0.2 second). When the physical size of the first point of interest is N times the designated size, the processor 120 may determine the high-speed shooting time to N time (for example, about N×0.2 second). N may be a value larger than 0. The physical size may include at least one of a width of the point of interest, a horizontal length of the point of interest, or a vertical length of the point of interest.

When a motion detection condition of an external object is satisfied among the at least one first designated conditions through the first point of interest, the processor 120 may determine the high-speed shooting time based on a time during which the motion of the external object is detected within the first point of interest. For example, when the motion of the external object is detected through the first point of interest during an A time period, the processor 120 may determine the high-speed shooting time to an A time (for example, about A×0.2 second). A may be a value larger than 0. In another example, the processor 120 may determine the high-speed shooting time regarding the first point of interest based on a user input. For example, the processor 120 may determine the high-speed shooting time regarding the first point of interest to 0.2 second based on a user input. According to an embodiment, when the at least one first designated condition is satisfied through the first point of interest, the processor 120 may control the camera module 180 to perform high-speed shooting according to the second frame rate for the high-speed shooting time determined for the first point of interest.

The processor 120 may determine a frame rate for high-speed shooting with respect to at least one point of interest. For example, the processor 120 may determine the frame rate for high-speed shooting for the first point of interest among the plurality of points of interest to the second frame rate higher than the first frame rate, and may determine the frame rate for high-speed shooting for the second point of interest among the plurality of points of interest to a third frame rate higher than the first frame rate. The third frame rate may be the same as or different from the second frame rate. In another example, the processor 120 may determine the frame rate for high-speed shooting with respect to at least one point of interest to the second frame rate higher than the first frame rate.

The processor 120 may determine whether to perform high-speed shooting based on a movement position of a subject and a designated subject movement path. For example, when the movement position of the subject corresponds to the designated subject movement path, the processor 120 may detect the motion of the subject through at least one point of interest, and may control the camera module 180 to perform high-speed shooting. In another example, when the movement position of the subject deviates from the designated subject movement path, the processor 120 may be restrained from performing high-speed shooting. When the movement position of the subject deviates from the designated subject movement path while default shooting is performed according to the first frame rate, the processor 120 may control the camera module 180 to end the default shooting, and may be restrained from performing high-speed shooting.

The processor 120 may detect a moving image shooting end event, and, in response to the moving image shooting end event, may control the camera module 180 to end default shooting and/or high-speed shooting. The moving image shooting end event may be detected by at least one of, for example, a user input, the elapse of a designated time, completion of high-speed shooting as many times as a designated number of times of detection of all points of interest, or detection of a motion of an external object at an end position of a designated subject movement path. For example, the processor 120 may control the camera module 180 to end default shooting and/or high-speed shooting in response to a user input requesting the end of default shooting and/or high-speed shooting. In another example, when the first designated condition is not satisfied within a designated time in a point of region selected from the plurality of points of interest, the processor 120 may control the camera module 180 to end default shooting and/or high-speed shooting. For example, when a motion of at least one external object is not detected within the designated time in a point of interest selected from at least one point of interest, the processor 120 may control the camera module 180 to end default shooting and/or high-speed shooting. In another example, when high-speed shooting is completed as many times as the designated number of times of detection of each of the set at least one point of interest, the processor 120 may control the camera module 180 to end default shooting and/or high-speed shooting. In still another example, when a motion of an external object is detected at an end position of the designated subject movement path, the processor 120 may control the camera module 180 to end default shooting and/or high-speed shooting.

The processor 120 may control the camera module 180 and/or the memory 130 to store a plurality of images obtained according to the first frame rate and a plurality of images obtained by at least one point of interest according to the second frame rate in the memory 130 altogether or separately. For example, the processor 120 may generate a moving image including a first section including the plurality of images obtained according to the first frame rate, a second section including the plurality of images obtained by the first point of interest according to the second frame rate, and a third section including a plurality of images obtained by the second point of interest according to the second frame rate or the third frame rate, and may store the generated moving image in the memory 130. In another example, the processor 120 may generate a first moving image including the plurality of images obtained according to the first frame rate, a second moving image including the plurality of images obtained by the first point of interest according to the second frame rate, and a third moving image including the plurality of images obtained by the second point of interest according to the second frame rate or the third frame rate, and may store the generated first, second, and third moving images in the memory 130, respectively.

The memory 250 of the camera module 180 may include a high-speed shooting memory (not shown) to temporarily store a plurality of images obtained by high-speed shooting. The high-speed shooting memory (not shown) may be omitted according to a maximum frame rate that is supportable by at least one interface (for example, an interface of the image sensor 230) within the camera module 180. For example, when the maximum frame rate supportable by the interface of the image sensor 230 is lower than the second frame rate (for example, about 960 fps), image data obtained through the lens assembly 210 and/or the image sensor 230 cannot be provided to the image signal processor 260 simultaneously. Therefore, the memory 250 may include the high-speed shooting memory (not shown).

In another example, when the maximum frame rate supportable by the interface of the image sensor 230 is higher than or equal to the second frame rate, image data obtained through the lens assembly 210 and/or the image sensor 230 can be provided to the image signal processor 250 simultaneously. Therefore, the memory 250 may not include the high-speed shooting memory. For example, when the maximum frame rate supportable by the interface of the image sensor 230 is higher than or equal to the second frame rate, image data obtained through the lens assembly 210 and/or the image sensor 230 according to the second frame rate may be provided to the image signal processor 260 without passing through the high-speed shooting memory. In another example, when the maximum frame rate supportable by the interface of the image sensor 230 is lower than the second frame rate, at least part of image data obtained through the lens assembly 210 and/or image sensor 230 according to the second frame rate may be temporarily stored in the high-speed shooting memory of the memory 250, and then may be provided to the image signal processor 260.

An electronic device (e.g., the electronic device 101 of FIG. 1) may include at least one camera (e.g., the camera module 180 of FIG. 1); a memory (e.g., the memory 130 of FIG. 1); and a processor (for example, the processor 120 of FIG. 1). The processor 120 may be configured to set a first point of interest and a second point of interest related to a moving image to be generated by using the at least one camera; obtain a plurality of first images according to a first frame rate by using the at least one camera; identify, through the first point of interest and the second point of interest by using at least a part of the plurality of first images, at least one external object that is being moved; in response to a motion of the at least one external object through the first point of interest, obtain a plurality of second images regarding the at least one external object according to a second frame rate higher than the first frame rate by using the at least one camera; in response to a motion of the at least one external object through the second point of interest, obtain a plurality of third images regarding the at least one external object according to the second frame rate or a third frame rate higher than the first frame rate by using the at least one camera; and, as a part of the moving image, generate the moving image including a first section generated by using at least a part of the plurality of first images, a second section generated by using the plurality of second images, and a third section generated by using the plurality of third images.

According to various embodiments of the present disclosure, the processor 120 may be configured to identify a path which is set in relation to the first point of interest and the second point of interest; and identify the at least one external object through the first point of interest and the second point of interest, based on orders of the first point of interest and the second point of interest according to the set path.

According to various embodiments of the present disclosure, the processor 120 may be configured to complete shooting of the moving image based on the orders or the set path.

According to various embodiments of the present disclosure, the processor 120 may be configured to monitor a motion path of the at least one external object; and determine whether to generate the first section or the second section based on comparison of the motion path of the at least one external object and the set path.

According to various embodiments of the present disclosure, the processor 120 may be configured to, when the at least one external object is positioned within a threshold range from a start point of the set path, determine to generate the first section, and to obtain the plurality of first images according to the first frame rate.

According to various embodiments of the present disclosure, the processor 120 may be configured to, when the at least one external object is positioned out of a threshold range from the set path, be restrained from generating at least one of the second section and the third section.

According to various embodiments of the present disclosure, the processor 120 may be configured to: identify at least one of a monitoring order or a monitoring method regarding the first point of interest and the second point of interest, or a number of times of detection of an external object; select at least one of the first point of interest and the second point of interest, based on at least one of the monitoring order, the monitoring method, or the number of times of detection of the external object; and identify the at least one external object through the selected at least one point of interest.

According to various embodiments of the present disclosure, the at least one external object may include a first external object and a second external object, and the processor 120 may be configured to detect a motion of the first external object through the first point of interest, and to detect a motion of the second external object through the second point of interest.

According to various embodiments of the present disclosure, the processor 120 may be configured to determine a shooting time regarding the first point of interest; and obtain the plurality of second images regarding the at least one external object according to the second frame rate for the determined shooting time.

According to various embodiments of the present disclosure, the shooting time may be determined based on at least one of a user input, a size of the first point of interest, or a time during which a motion of the at least one external object is detected through the first point of interest.

According to various embodiments of the present disclosure, the at least one camera may include a first camera having a first angle of view, and a second camera having a second angle of view larger than or equal to the first angle of view. The processor 120 may be configured to set the first point of interest and the second point of interest in a preview region of the first camera having the first angle of view; set a moving image shooting trigger region in a preview region of the second camera having the second angle of view; and, when the at least one external object is detected through the moving image shooting trigger region, control the first camera to obtain the plurality of first images according to the first frame rate.

According to various embodiments of the present disclosure, an electronic device (e.g., the electronic device 101 of FIG. 1) may include: at least one camera (e.g., the camera module 180 of FIG. 1); a memory (e.g., the memory 130 of FIG. 1); and a processor (e.g., the processor 120 of FIG. 1). The processor 120 may be configured to set at least one point of interest related to a moving image to be generated by using the at least one camera; identify, through the at least one point of interest; in response to a motion of the at least one external object through the at least one point of interest, at least one external object that is being moved, obtain a plurality of images regarding the at least one external object according to a designated frame rate for a time designated for the at least one point of interest by using the at least one camera; and generate the moving image including the obtained plurality of images.

Figure 3:
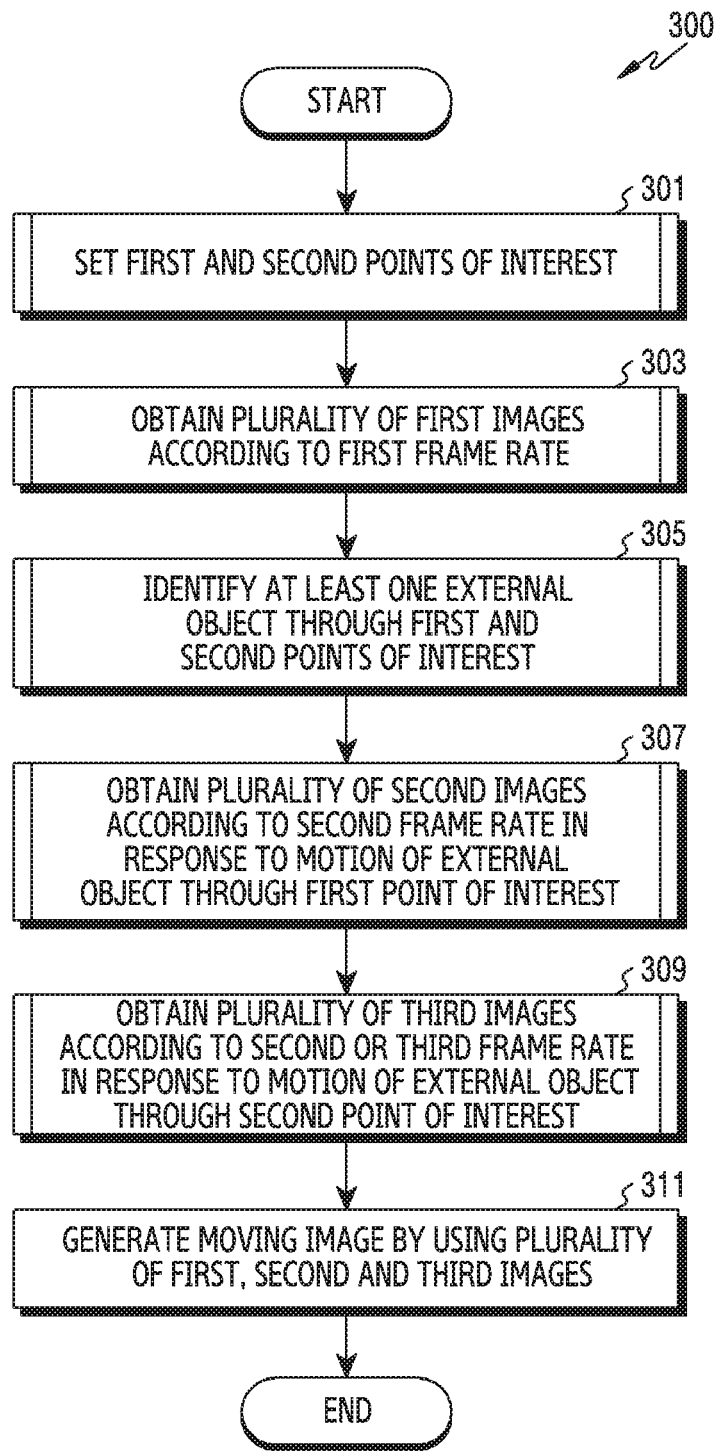
FIG. 3 is a flowchart for generating a moving image by using a plurality of points of interest in an electronic device according to an embodiment of the disclosure.

FIG. 3 is a flowchart 300 for generating a moving image by using a plurality of points of interest in an electronic device according to an embodiment of the disclosure.

Referring to FIG. 3, respective operations may be performed in sequence but may not necessarily be performed in sequence. For example, the order of the operations may be changed or at least two operations may be performed in parallel. Herein, the electronic device may be the electronic device 101. In the following description, at least part of the operations of FIG. 3 will be described with reference to FIG. 4.

Figure 4:
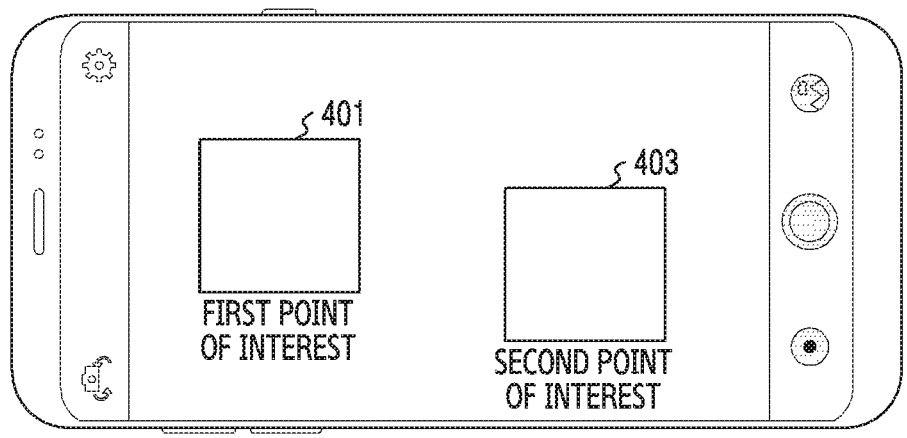
FIG. 4 is a view illustrating an example of a screen in which a plurality of points of interest are set in an electronic device according to an embodiment of the disclosure.

FIG. 4 is a view illustrating an example of a screen in which a plurality of points of interest are set in an electronic device according to an embodiment of the disclosure.

Referring to FIGS. 3 and 4, in operation 301, the electronic device (e.g., the processor 120 of FIG. 1) according to various embodiments may set a first point of interest and a second point of interest. The processor 120 may set the first point of interest and the second point of interest related to a moving image to be generated by using at least one camera.

For example, the processor 120 may automatically set the first point of interest and the second point of interest based on a touch input position of a user or a point-of-interest setting mode, and may control a display (e.g., the display device 160 of FIG. 1) to display the first point of interest and the second point of interest within a preview screen. The point-of-interest setting mode may be determined by a user input or may be determined based on a result of image analysis. For example, the processor 120 may set a first point of interest 401 and a second point of interest 403 within a preview screen region corresponding to at least one camera, based on a touch input position of a user or a point-of-interest setting mode. At least one of the size, shape, color, luminance, or transparency of the first point of interest 401 and the second point of interest 403 may be changed based on a user input. The processor 120 may automatically adjust at least one of the color, luminance, transparency, or shape of at least one of the first point of interest and the second point of interest, such that the first point of interest and the second point of interest are visually distinguished from background images displayed in the preview screen.

In operation 303, the electronic device may obtain a plurality of first images according to the first frame rate. The processor 120 may detect a moving image shooting trigger event in the preview state, and, in response to the moving image shooting trigger event being detected, the processor 120 may obtain the plurality of first images according to the first frame rate by using at least one camera (e.g., the camera module 180 of FIG. 1). The moving image shooting trigger event may be detected based on at least one of a designated subject movement path or a designated moving image shooting trigger region. The processor 120 may monitor a start position, start point, or start region of the designated subject movement path or the designated moving image shooting trigger region in the preview state, and may determine whether at least one second designated condition is satisfied. When the at least one second designated condition is satisfied through the start position of the designated subject movement path or the designated moving image shooting trigger region, the processor 120 may control the at least one camera to obtain the plurality of first images according to the first frame rate. The at least one second designated condition may include at least one of, for example, detection of a motion of at least one external object (or subject), detection of a designated color, detection of a designated image (for example, a face image, an image of a smiling face), detection of a designated shape (for example, an animal shape, a person shape, a shape of a thing) or detection of a designated type of object.

In operation 305, the electronic device may identify at least one external object through the first point of interest and the second point of interest. The processor 120 may identify at least one external moving object through the first point of interest and the second point of interest by using at least a part of the plurality of first images. The processor 120 may select at least one of the first point of interest and the second point of interest, as a region to be monitored, based on at least one of a monitoring order, a monitoring method, or the number of times of detection of the first point of interest and the second point of interest, and may monitor the selected at least one point of interest and may identify at least one external moving object.

In operation 307, the electronic device (e.g., the processor 120) may obtain a plurality of second images according to the second frame rate in response to a motion of the external object through the first point of interest. The processor 120 may obtain the plurality of second images regarding the at least one external object according to the second frame rate higher than the first frame rate by using at least one camera, in response to the motion of the at least one external object through the first point of interest. For example, when a motion of a first external object is detected through the first point of interest, the processor 120 may control the camera module 180 to obtain the plurality of second images regarding the first external object at the second frame rate. The processor 120 may obtain the plurality of second images according to the second frame rate in response to a designated color, a designated image (e.g., a face image, an image of a smiling face), a designated shape (e.g., an animal shape, a person shape, a shape of a thing), or a designated type of object, instead of the motion of the external object. The processor 120 may obtain the plurality of second images according to the second frame rate for a designated high-speed shooting time. The processor 120 may determine the high-speed shooting time regarding the first point of interest, based on a physical size of the first point of interest, a time during which the motion of the external object is detected through the first point of interest, or a user input, and may obtain the plurality of second images according to the second frame rate for the determined high-speed shooting time.

In operation 309, the electronic device may obtain a plurality of third images according to the second or third frame rate in response to a motion of an external object through the second point of interest. The processor 120 may obtain the plurality of third images regarding at least one external object according to the second frame rate or the third frame rate higher than the first frame rate by using at least one camera, in response to the motion of at least one external object through the second point of interest. For example, when a motion of at least one of the first external object or the second external object is detected through the second point of interest, the processor 120 may control the camera module 180 to obtain the plurality of third images regarding the at least one external object at the second or third frame rate.

The processor 120 may obtain the plurality of third images according to the second or third frame rate in response to a designated color, a designated image (e.g., a face image, an image of a smiling face), a designated shape (e.g., an animal shape, a person, a shape of a thing), or a designated type of object, instead of the motion of the external object. The processor 120 may obtain the plurality of third images according to the second frame rate for a designated high-speed shooting time. The processor 120 may determine the high-speed shooting time regarding the second point of interest based on a physical size of the second point of interest, a time during which the motion of the external object is detected through the second point of interest, or a user input, and may obtain the plurality of third images according to the second or third frame rate for the determined high-speed shooting time.

In operation 311, the electronic device may generate a moving image by using the plurality of first images, the plurality of second images, and the plurality of third images. The processor 120 may generate, as a part of the moving image, a moving image including a first section generated by using at least a part of the plurality of first images, a second section generated by using the plurality of second images, and a third section generated by using the plurality of third images.

Figure 5:
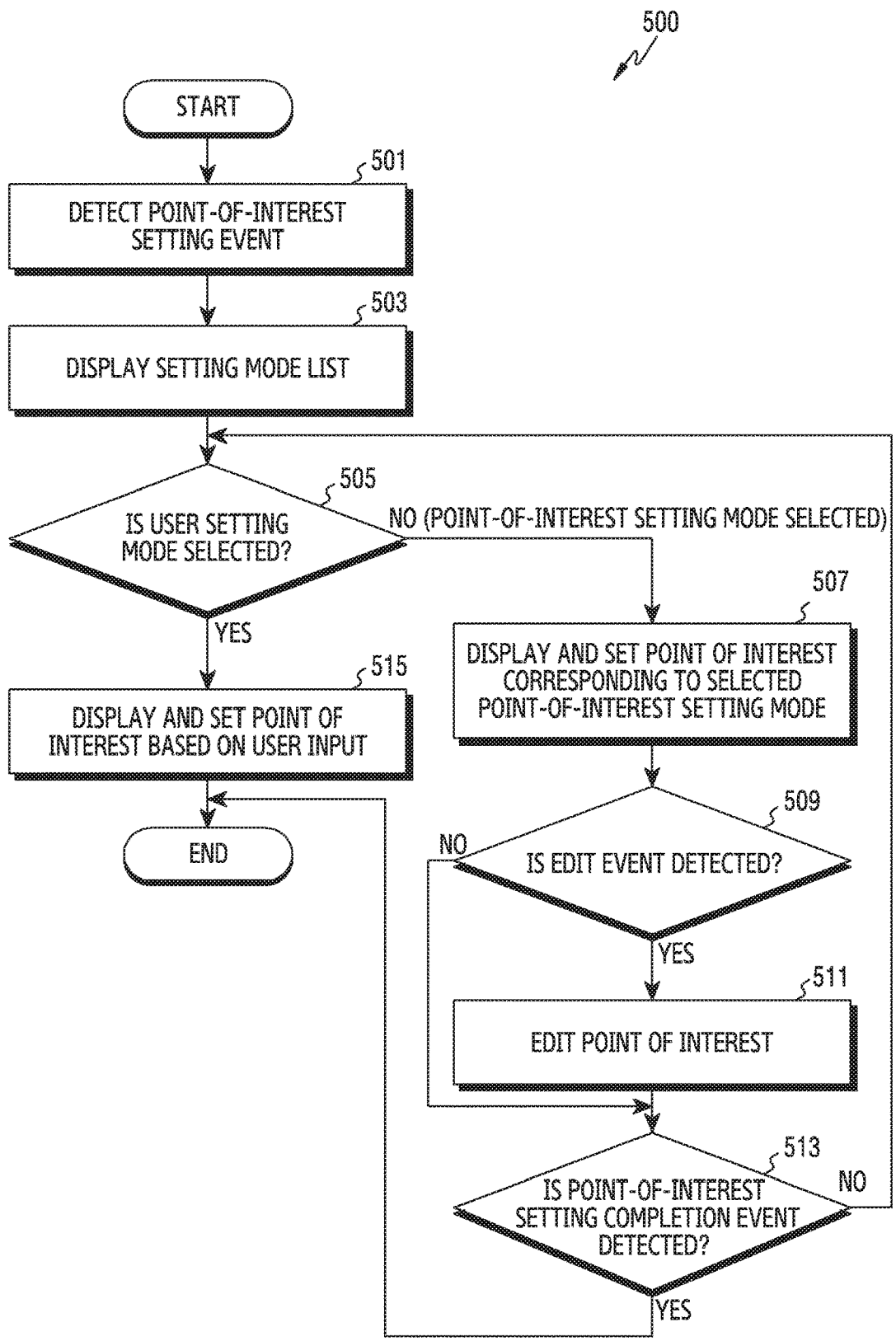
FIG. 5 is a flowchart for setting at least one point of interest in an electronic device according to an embodiment of the disclosure.

FIG. 5 is a flowchart 500 for setting at least one point of interest in an electronic device according to an embodiment the disclosure.

Operations of FIG. 5 described hereinbelow may be at least a part of the detailed operations of operation 301 of FIG. 3. The respective operations may be performed in sequence but may not necessarily be performed in sequence. For example, the order of the operations may be changed or at least two operations may be performed in parallel. Herein, the electronic device may be the electronic device 101 of FIG. 1. Hereinafter, at least a part of the operations of FIG. 5 will be described with reference to FIGS. 6A, 6B, 6C, 6D, and 6E.

Figure 6A:
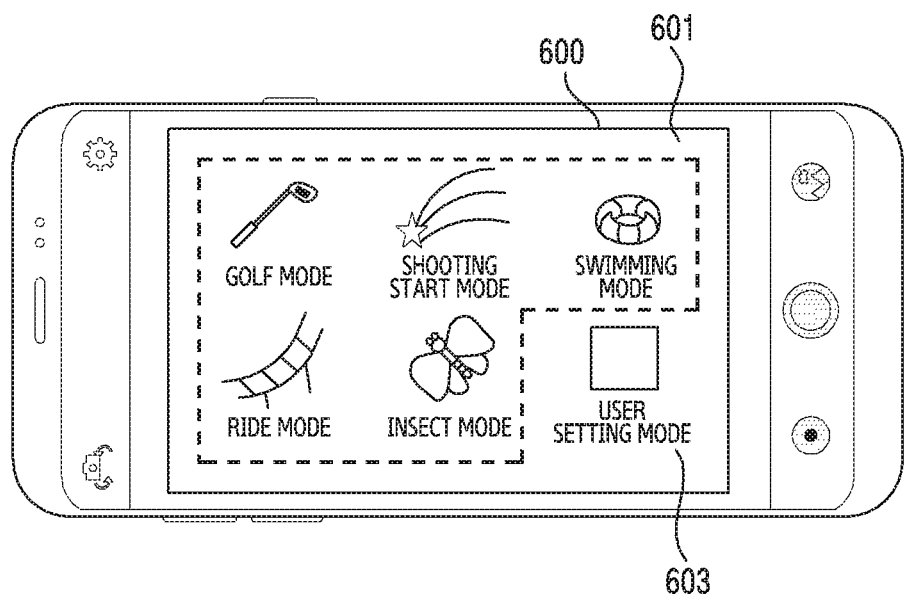
FIG. 6A is a view illustrating an example of a screen displaying a list including point-of-interest setting modes in an electronic device according to an embodiment of the disclosure.

FIG. 6A is a view illustrating an example of a screen displaying a list including point-of-interest setting modes in an electronic device according to an embodiment of the disclosure.

Figure 6B:
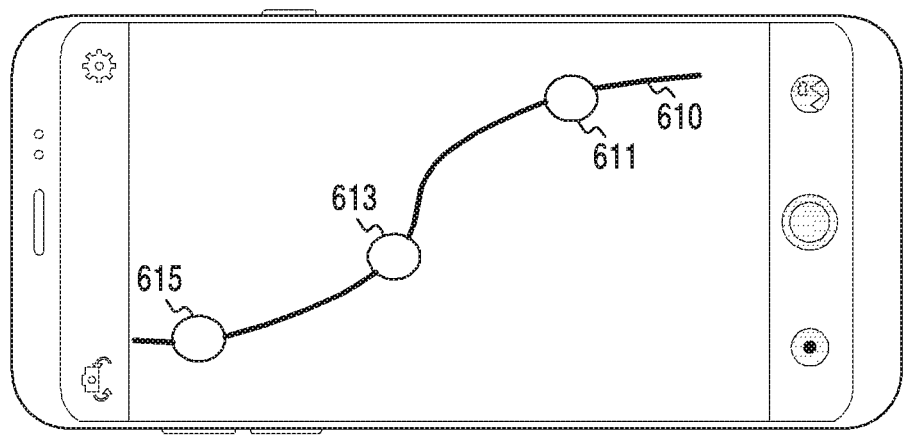
FIG. 6B is a view illustrating an example of a screen for setting at least one point of interest in the electronic device according to an embodiment of the disclosure.
Figure 6C:
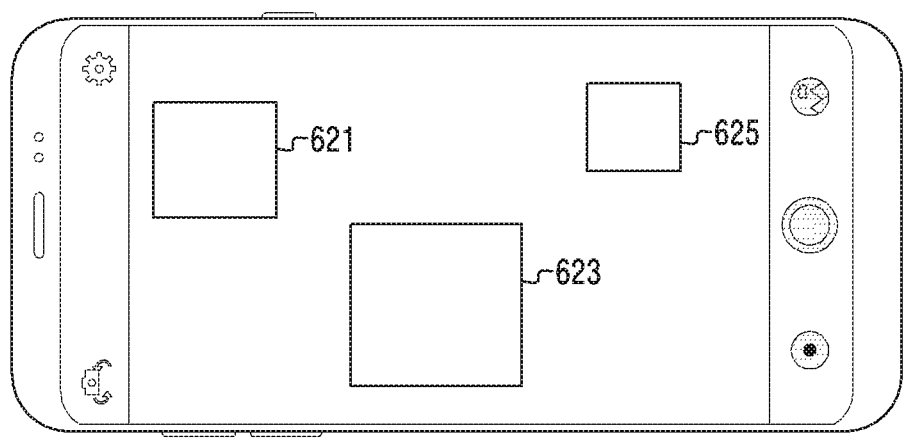
FIG. 6C is a view illustrating an example of a screen for setting at least one point of interest in the electronic device according to an embodiment of the disclosure.
Figure 6D:
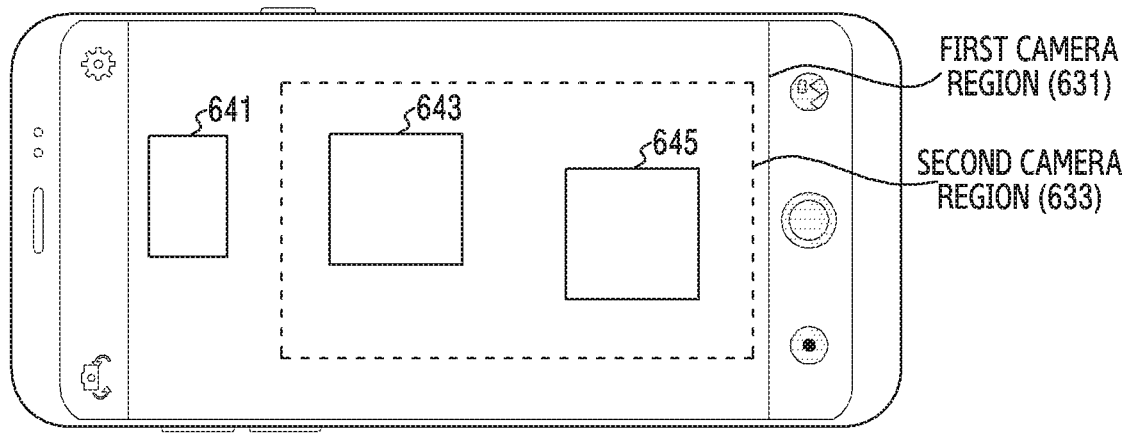
FIG. 6D is a view illustrating an example of a screen for setting at least one point of interest in the electronic device according to an embodiment of the disclosure.
Figure 6E:
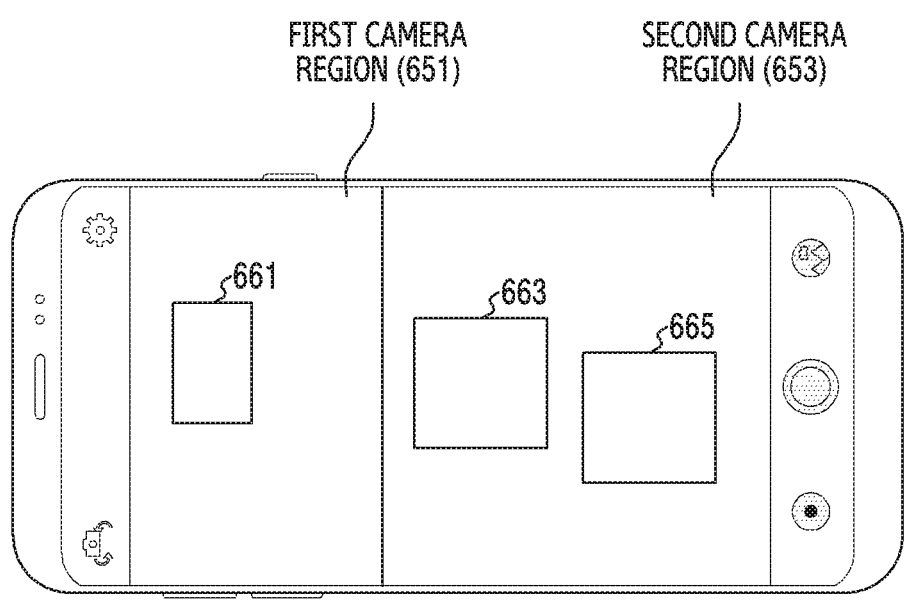
FIG. 6E is a view illustrating an example of a screen for setting at least one point of interest in the electronic device according to an embodiment of the disclosure.

FIG. 6B is a view illustrating an examples of screen for setting at least one point of interest in the electronic device according to an embodiment of the disclosure. FIG. 6C is a view illustrating an examples of screen for setting at least one point of interest in the electronic device according to an embodiment of the disclosure. FIG. 6D is a view illustrating an examples of screen for setting at least one point of interest in the electronic device according to an embodiment of the disclosure. FIG. 6E is a view illustrating an examples of screen for setting at least one point of interest in the electronic device according to an embodiment of the disclosure.

Referring to FIG. 5 and FIGS. 6A-6E, in operation 501, the electronic device (e.g., the processor 120 of FIG. 1) may detect a point-of-interest setting event. The processor 120 may detect a point-of-interest setting event in a preview state in which at least one camera (e.g., the camera module 180) is controlled to display a preview image on the screen. For example, the processor 120 may determine that the point-of-interest setting event occurs by detecting at least one of a user input (e.g., a touch input), a designated gesture, a designated button input, a force touch input, a long touch input, a double touch input, or a drag input on a point-of-interest setting menu item or icon in the preview state.

In operation 503, the electronic device may display a list including modes for setting a point of interest. The processor 120 may control the display device 160 to display the list including the modes for setting the point of interest on at least a part of the screen, while displaying the preview screen, in response to the point-of-interest setting event being detected in the preview state. The list including the modes for setting the point of interest may include a user setting mode to manually set a point of interest based on a user input, and at least one point-of-interest setting mode for automatically setting a point of interest. The point-of-interest setting modes may be already determined based on at least one of, for example, a subject, a type of the subject, a motion estimated path of the subject, a motion speed of the subject, or a type of exercise. For example, the point-of-interest setting modes may include at least one of a point-of-interest setting mode according to a subject type (e.g., a shooting star mode, an insect mode), a point-of-interest setting mode for shooting a subject performing a specific type of exercise (e.g., a golf mode, a skate board mode, a swimming mode), or a point-of-interest setting mode for shooting a subject moving along a designated path (e.g., a specific ride mode).

Referring to FIG. 6A, the processor 120 may display a screen 600 including a list including modes 601 for automatically setting a point of interest and a user setting mode 603 for manually setting a point of interest. The modes for automatically setting a point of interest may include at least one of a golf mode, a shooting star mode, a swimming mode, a ride mode, or an insect mode. This is merely an example, and various embodiments of the disclosure are not limited thereto. The electronic device may determine whether a user setting mode is selected from the displayed list in operation 505. The processor 120 may determine whether a user input for selecting the user setting mode in the displayed list is detected.

When the user setting mode is selected, the electronic device may set and display at least one point of interest based on a user input in operation 515. When the user setting mode is selected, the processor 120 may provide a user interface to set at least one point of interest within the preview screen. The user interface for setting at least one point of interest may include menu items for setting and/or changing at least one of the shape, color, size, number, luminance, transparency of the point of interest. The processor 120 may detect a position where the user input is detected within the preview screen, and may control the display device 160 to set and display at least one point of interest based on the detected position. For example, when a user input (e.g., a single touch, a long touch, a double touch, or a drag) on an A region within the preview screen is detected, the processor 120 may control the display device 160 to set and display a point of interest including the A region. For example, when a drag input in the shape of a closed loop line or a polygon on the A region is detected, the processor 120 may control the display device 160 to set and display a point of interest including the A region and formed in the shape of the closed loop line or the polygon. In another example, when a single touch on the A region is detected, the processor 120 may control the display device 160 to set and display a point of interest of a designated size and shape including the A region.

The processor 120 may control the display device 160 to additionally set and display a movement path of a subject within the preview screen based on a user input. For example, when a drag in the form of a straight line and/or a curved line is detected, the processor 120 may additionally set and display a movement path of the subject in the form of the straight line and/or curved line. The subject movement path may be set to connect a plurality of points of interest to one another. The processor 120 may control the display device 160 to additionally set and display a moving image shooting trigger region within the preview screen, based on a user input (e.g., a single touch, a long touch, a double touch, or a drag). The moving image shooting trigger region and the point of interest may be displayed to be visually distinguished from each other. For example, at least one of the color, transparency, luminance, or shape of the moving image shooting trigger region may be different from at least one of the color, transparency, luminance, or shape of the point of interest. The processor 120 may determine at least one of a monitoring order, a monitoring method, and the number of times of detection of at least one point of interest based on a user input. According to an embodiment, the processor 120 may determine a high-speed shooting time regarding at least one point of interest based on a user input.

When the user setting mode is not selected (or a point-of-interest setting mode is selected in the displayed list), the electronic device may set and display at least one point of interest corresponding to the point-of-interest setting mode selected by a user input in operation 507. When the user setting mode is not selected and any one of the point-of-interest setting modes for automatically setting a point of interest is selected, the processor 120 may control the display device 160 to display and set at least one point of interest corresponding to the selected point-of-interest setting mode within the preview screen. The size, shape, position, number, color, luminance, or transparency of at least one point of interest corresponding to each of the point-of-interest setting modes may be different. For example, the number of points of interest corresponding to a first point-of-interest setting mode may be 2, and the number of points of interest corresponding to a second point-of-interest setting mode may be 4. In another example, the shape of the at least one point of interest corresponding to the first point-of-interest setting mode may be rectangular, and the shape of the at least one point of interest corresponding to the second point-of-interest setting mode may be circular. The processor 120 may control the display 160 to additionally set and display a subject movement path based on a point-of-interest setting mode. According to an embodiment, the processor 120 may control the display device 160 to additionally set and display a moving image shooting trigger region based on a point-of-interest setting mode.

Referring to FIG. 6B, the processor 120 may control the display device 160 to set and display a subject movement path 610 and three points of interest 611, 613, and 615 within the preview screen.

Referring to FIG. 6C, the processor 120 may control the display device 160 to set and display three points of interest 621, 623, and 625 of different sizes within the preview screen, based on the second point-of-interest setting mode.

Referring to FIG. 6D, based on a third point-of-interest setting mode, the processor 120 may control the display device 160 to set and display two points of interest 643 and 645 within a region 633 of a second camera (or a preview screen display region of the second camera) of the preview screen, and may control the display device 160 to set and display a moving image shooting trigger region 641 on a region of the region of the first camera (or the preview screen display region 631 of the first camera) that is not included in the region 633 of the second camera.

Referring to FIG. 6E, based on a fourth point-of-interest setting mode, the processor 120 may control the display device 160 to set and display one point of interest 661 in a region 651 of the first camera of the preview screen, and may control the display device 160 to set and display two points of interest 663 and 665 in a region 653 of the second camera. According to an embodiment, the processor 120 may determine at least one of the monitoring order, monitoring method, or the number of times of detection of at least one point of interest, based on the selected point-of-interest setting mode. At least one of the monitoring order, the monitoring method, or the number of times of detection of at least one point of interest according to a point-of-interest setting mode may be already set by a designer. The processor 120 may control at least one of the at least one point of interest, the subject movement path, or the moving image shooting trigger region to be visually distinguished from background images displayed on the preview screen. For example, at least one of the color, luminance, transparency, or shape of at least one of the at least one point of interest, the subject movement path, or the moving image shooting trigger region may be automatically adjusted. According to an embodiment, the processor 120 may display a user interface through which setting of a high-speed shooting time regarding at least one point of interest is requested, and may receive an input of a high-speed shooting time regarding at least one point of interest from the user.

In operation 509, the electronic device may detect whether an edit event occurs. The processor 120 may detect whether the edit event occurs in the state in which the at least one point of interest is displayed within the preview screen. For example, the processor 120 may detect at least one of a user input on a point-of-interest edit menu item or icon, a user input on the point of interest, a user input on the subject movement path, a user input on the moving image shooting trigger region, a designated gesture, a designated button input, a force touch input, a long touch input, a double touch input, or a drag input, and may determine that the point-of-interest edit event occurs. The user input may include at least one of a single touch, a double touch, a long touch, or a force touch.

When the point-of-interest edit event occurs, the electronic device may edit the at least one point of interest based on a user input in operation 511. The processor 120 may provide a user interface through which the at least one point of interest set within the preview screen can be edited. The user interface to edit the at least one point of interest may include menu items capable of changing at least one of the shape, color, size, number, luminance, transparency of the point of interest. For example, the processor 120 may change the shape of the at least one point of interest based on a user input. In another example, the processor 120 may add or delete at least one point of interest based on a user input.

In operation 513, the electronic device may detect whether a point-of-interest setting completion event occurs. The processor 120 may detect the point-of-interest setting completion event in the state in which the at least one point of interest is set in the preview screen. For example, the processor 120 may detect at least one of a user input (for example, a touch input), a designated gesture, a designated button input, a force touch input, a long touch input, a double touch input, or a drag input on a point-of-interest setting completion menu item (or icon) in the preview state, and may determine that the point-of-interest setting completion event occurs. According to an embodiment, when the point-of-interest setting completion event occurs, the processor 120 may finish setting of the point of interest displayed within the preview screen.

Figure 7:
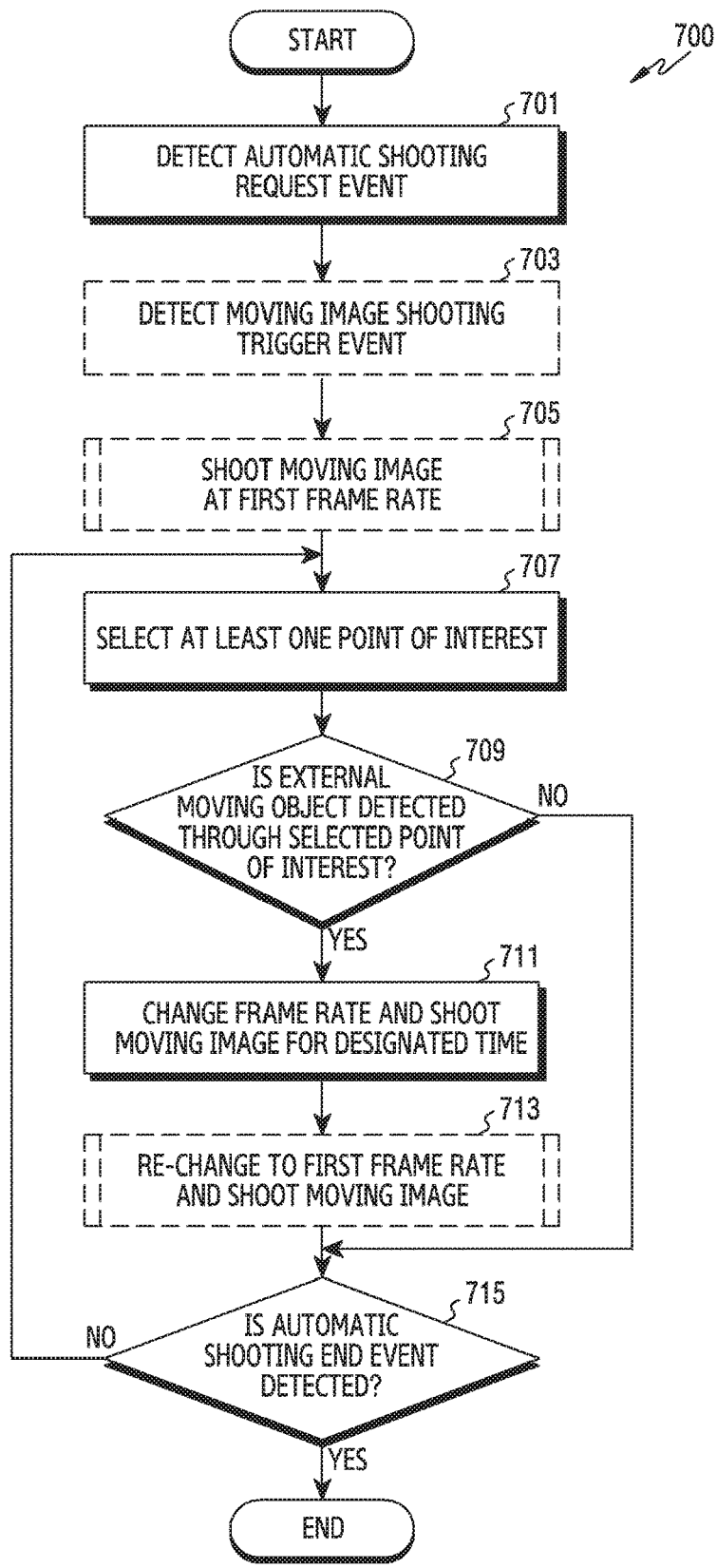
FIG. 7 is a flowchart for shooting a moving image at high speed through at least one point of interest in an electronic device according to an embodiment of the disclosure.

FIG. 7 is a flowchart 700 for performing high-speed moving image shooting through at least one point of interest in an electronic device according to an embodiment of the disclosure.

Operations of FIG. 7 described hereinbelow may be at least a part of the detailed operations of operations 303, 305, 307, 309 of FIG. 3. In the following embodiments, the respective operations may be performed in sequence but may not necessarily be performed in sequence.

Referring to FIG. 7, the order of the operations may be changed or at least two operations may be performed in parallel. At least one operation displayed by dashed lines in FIG. 7 may be omitted. The electronic device may be the electronic device 101 of FIG. 1. In the following description, at least some operation of FIG. 7 will be described with reference to FIGS. 8A, 8B, 9A, 9B, 9C, 9D, 9E, 10A, and 10B.

Figure 8A:
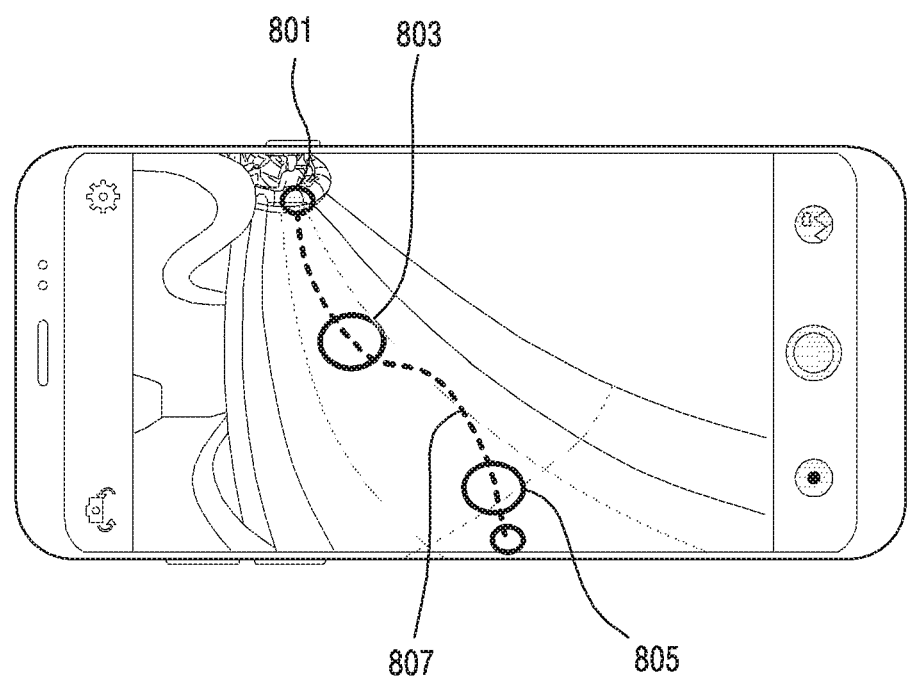
FIG. 8A is a view illustrating an example of a moving image shooting trigger condition in an electronic device according to an embodiment of the disclosure.
Figure 8B:
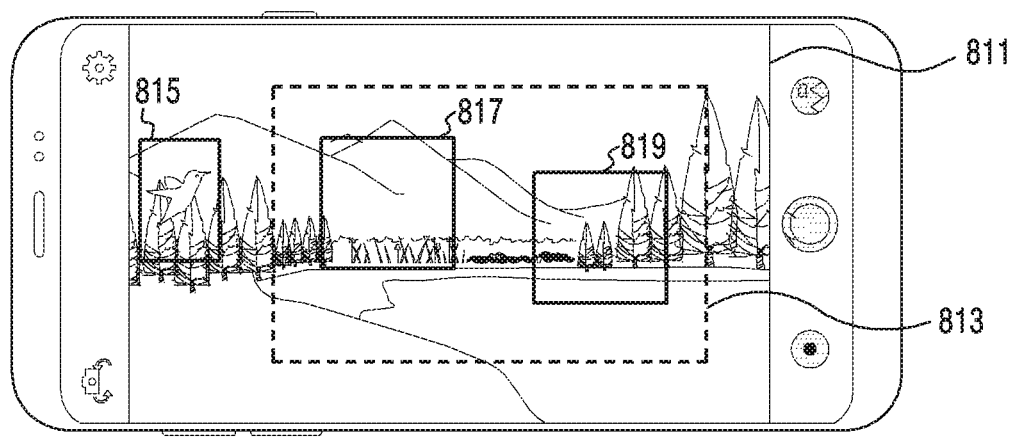
FIG. 8B is a view illustrating an example of the moving image shooting trigger condition in the electronic device according to an embodiment of the disclosure.

FIG. 8A is a view illustrating an example of a moving image shooting trigger condition in an electronic device according to an embodiment of the disclosure, and FIG. 8B is a view illustrating an example of the moving image shooting trigger condition in the electronic device according to an embodiment of the disclosure.

Figure 9A:
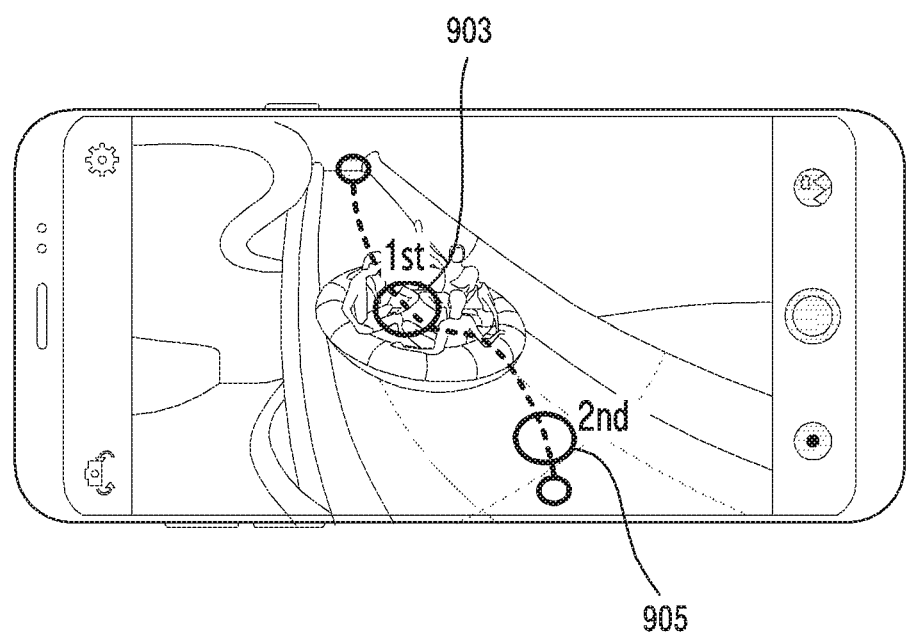
FIG. 9A is a view illustrating an example of shooting a moving image at high speed based on setting of at least one point of interest in an electronic device according to an embodiment of the disclosure.
Figure 9B:
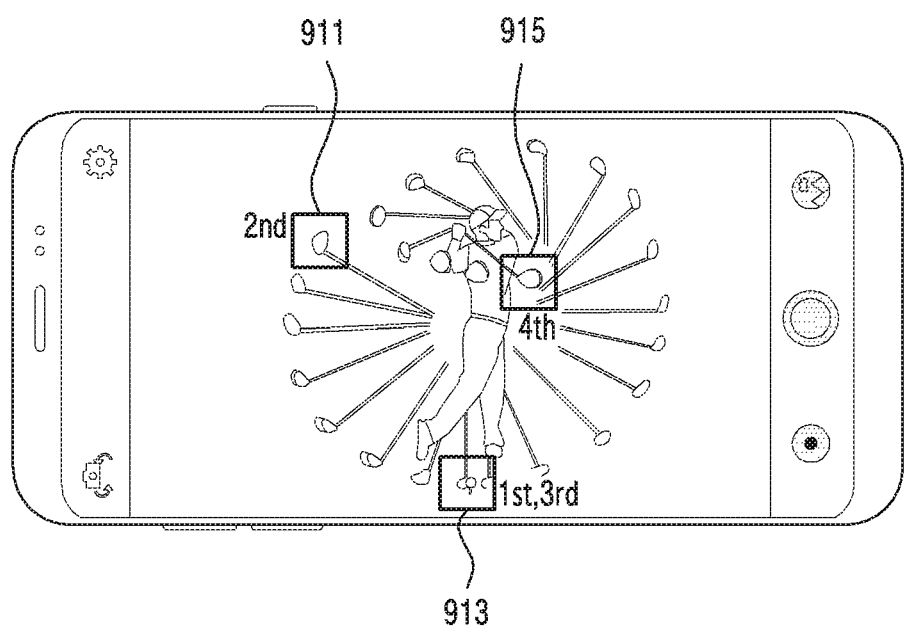
FIG. 9B is a view illustrating an example of shooting a moving image at high speed based on setting of at least one point of interest in the electronic device according to an embodiment of the disclosure.
Figure 9C:
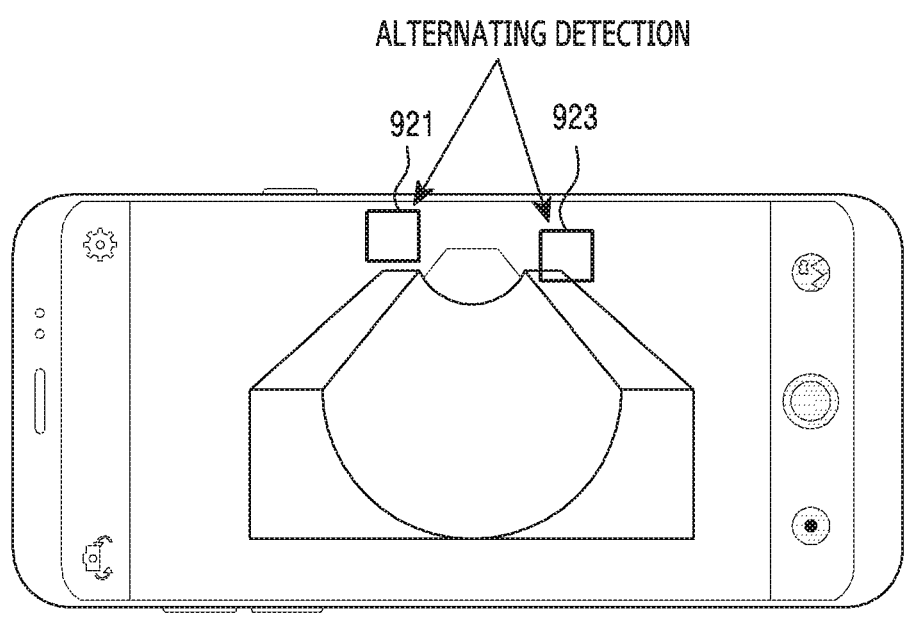
FIG. 9C is a view illustrating an example of shooting a moving image at high speed based on setting of at least one point of interest in the electronic device according to an embodiment of the disclosure.
Figure 9D:
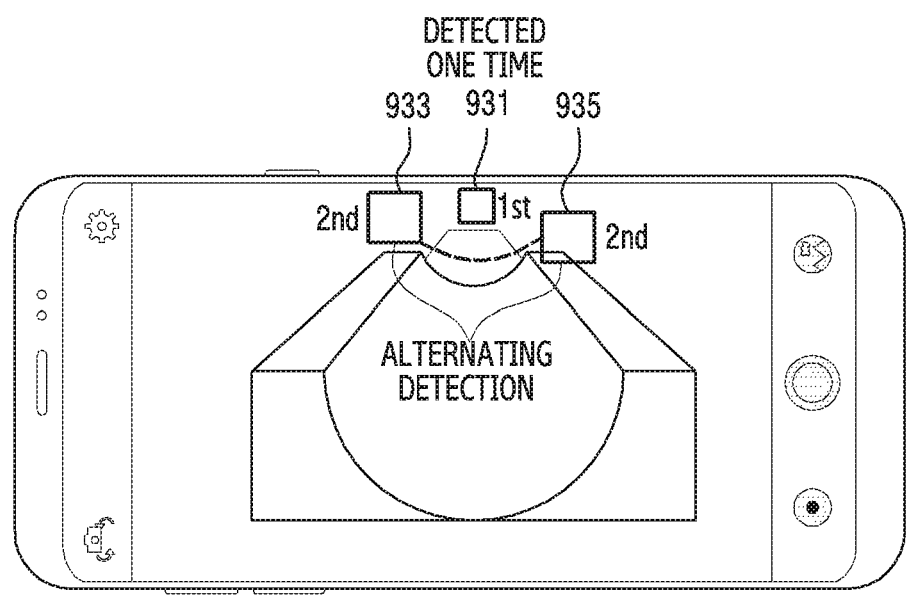
FIG. 9D is a view illustrating an example of shooting a moving image at high speed based on setting of at least one point of interest in the electronic device according to an embodiment of the disclosure.
Figure 9E:
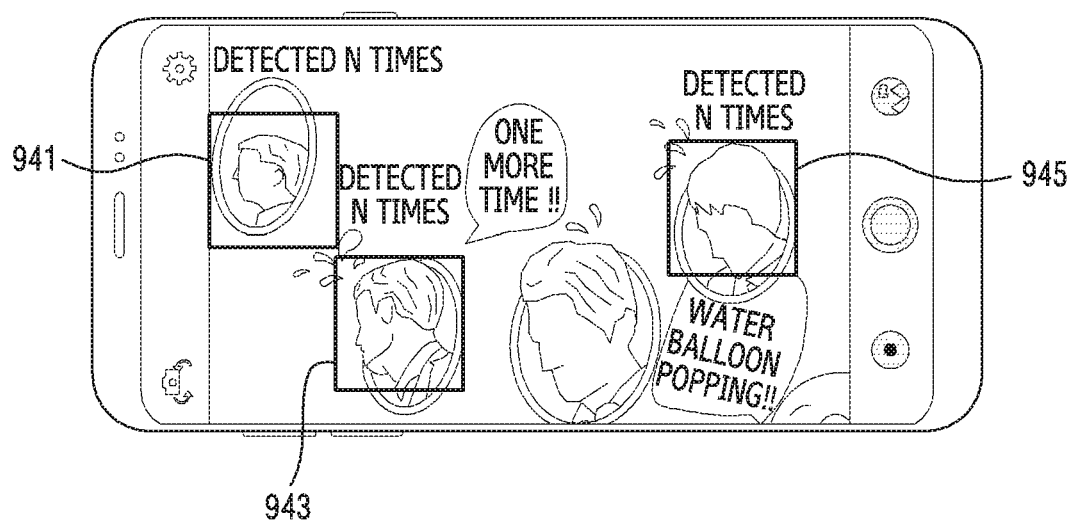
FIG. 9E is a view illustrating an example of shooting a moving image at high speed based on setting of at least one point of interest in the electronic device according to an embodiment of the disclosure.
Figure 10A:
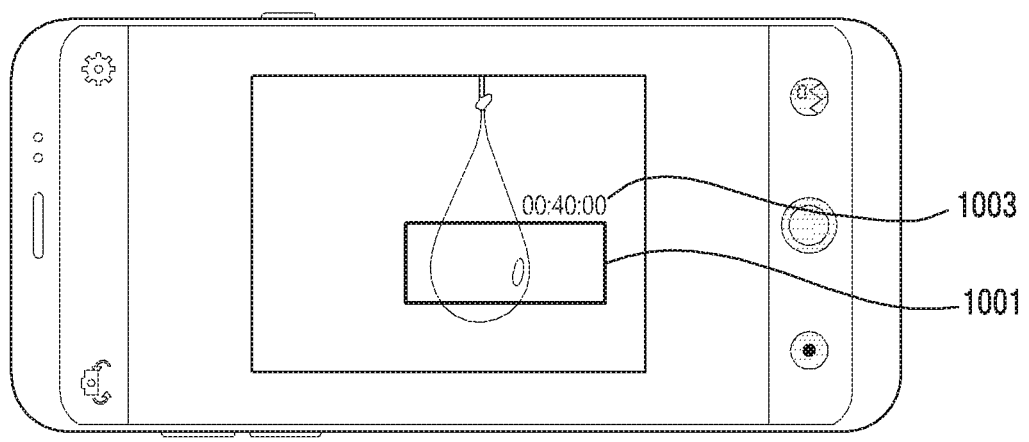
FIG. 10A is a view illustrating an example of a high-speed moving image shooting time regarding a point of interest in an electronic device according to an embodiment of the disclosure.
Figure 10B:
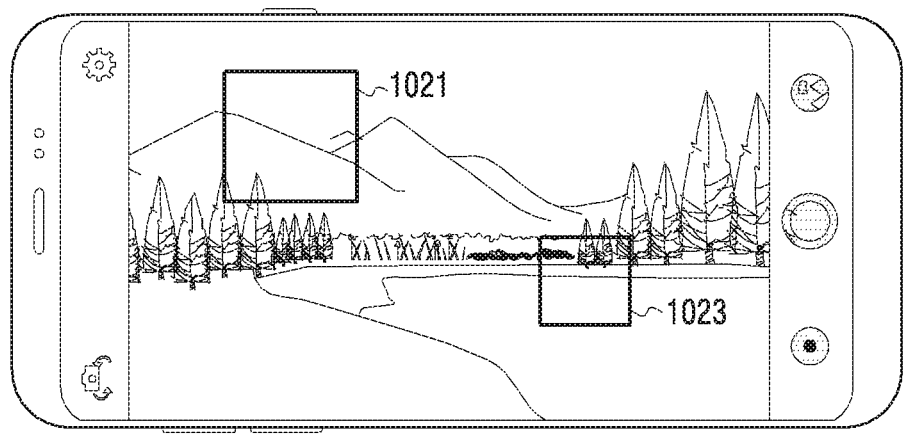
FIG. 10B is a view illustrating an example of a high-speed moving image shooting time regarding a point of interest in the electronic device according to an embodiment of the disclosure.

FIG. 9A is a view illustrating an example of performing high-speed moving image shooting based on setting of at least one point of interest in an electronic device according to an embodiment of the disclosure. FIG. 9B is a view illustrating an example of performing high-speed moving image shooting based on setting of at least one point of interest in the electronic device according to an embodiment of the disclosure. FIG. 9C is a view illustrating an example of performing high-speed moving image shooting based on setting of at least one point of interest in the electronic device according to an embodiment of the disclosure. FIG. 9D is a view illustrating an example of performing high-speed moving image shooting based on setting of at least one point of interest in the electronic device according to an embodiment of the disclosure. FIG. 9E is a view illustrating an example of performing high-speed moving image shooting based on setting of at least one point of interest in the electronic device according to an embodiment of the disclosure. FIG. 10A is a view illustrating an example of a high-speed moving image shooting time regarding a point of interest in an electronic device according to an embodiment of the disclosure, and FIG. 10B is a view illustrating an example of a high-speed moving image shooting time regarding a point of interest in the electronic device according to an embodiment of the disclosure.

Referring to FIG. 7, the electronic device (e.g., the processor 120 of FIG. 1) may detect an automatic shooting request event in operation 701. The processor 120 may detect an automatic shooting request event using a point of interest in a state in which at least one point of interest is set within a preview screen on which a preview image is displayed. The processor 120 may detect at least one of a user input (e.g., a touch input), a designated gesture, a designated button input, a force touch input, a long touch input, a double touch input, or a drag input on an automatic shooting request menu item or icon, and may determine that the automatic shooting request event occurs.

In operation 703, the electronic device may detect a moving image shooting trigger event. The processor 120 may determine whether the moving image shooting trigger event occurs in response to the automatic shooting request event being detected. The processor 120 may detect that the moving image shooting trigger event occurs based on at least one of a designated subject movement path or a designated moving image shooting trigger region. For example, the processor 120 may monitor a start position (or a start point, a start region) of the designated subject movement path or the designated moving image shooting trigger region in the preview state, and may determine whether at least one external moving object is detected. When the external object is detected, the processor 120 may determine that the moving image shooting trigger event occurs.

Referring to FIG. 8A, when a motion of at least one external object is detected at a start position 801 of a subject movement path 807 in a state in which a preview screen in which two points of interest 803 and 805 and the subject movement path 807 connecting the two points of interest 803 and 805 are set is displayed, the processor 120 may determine that the moving image shooting trigger event occurs.

Referring to FIG. 8B, when a motion of at least one external object is detected in a moving image shooting trigger region 815 in a state in which a preview screen in which two points of interest 817 and 819 are set in a region 813 of a first camera and the moving image shooting trigger region 815 is set in a region 811 of a second camera is displayed, the processor 120 may determine that the moving image shooting trigger event occurs.

In operation 705, the electronic device may shoot a moving image at the first frame rate. The processor 120 may control the camera module 180 to perform default moving image shooting to obtain a plurality of first images according to the first frame rate in response to the moving image shooting trigger event being detected. The processor 120 may control the camera module 180 to perform default moving image shooting to obtain the plurality of first images according to the first frame rate by using the first camera, in response to the moving image shooting trigger event being detected through the moving image shooting trigger region 815 in the region 811 of the second camera.

In operation 707, the electronic device may select at least one point of interest. The processor 120 may select at least one point of interest while obtaining the plurality of first images according to the first frame rate. The processor 120 may select at least one point of interest based on at least one of a pre-set monitoring order, a monitoring method, or the number of times of detection of at least one point of interest.

Referring to FIG. 9A, the processor 120 may select a point of interest 903 whose monitoring order is set to 1 from two points of interest 903 and 905.

Referring to FIG. 9B, the processor 120 may select a point of interest 913 whose monitoring order is set to 1 from three points of interest 911, 913, and 915.

Referring to FIG. 9C, the processor 120 may select all of two points of interest 921 and 923 based on the monitoring method of the two points of interest 921 and 923 being an alternating detection method and the monitoring order thereof not being set.

Referring to FIG. 9D, the processor 120 may select a point of interest 931 whose monitoring order is set to 1 from three points of interest 931, 933, and 935.

Referring to FIG. 9E, the processor 120 may select all of three points of interest 941, 943, and 945 when the monitoring order and the monitoring method of the three points of interest 941, 943, and 945 are not set.

In operation 709, the electronic device may determine whether an external moving object is detected through the selected at least one point of interest. The processor 120 may monitor the selected at least one point of interest based on at least a part of the plurality of first images obtained according to the first frame rate, and may determine whether at least one external moving object is detected through the selected at least one point of interest. When a plurality of points of interest are selected, the processor 120 may detect different external moving objects through the selected plurality of points of interest. For example, the processor 120 may detect a first external object through a first point of interest, and may detect a second external object through a second point of interest.

When an external moving object is detected through the selected point of interest, the electronic device may change the frame rate and shoot a moving image for a designated time in operation 711. The processor 120 may control the camera module 180 to perform high-speed moving image shooting to obtain a plurality of second images according to the second frame rate higher than the first frame rate, in response to the external moving object being detected through the selected point of interest. The processor 120 may identify a high-speed shooting time regarding the selected at least one point of interest, and may obtain the plurality of second images according to the second frame rate for the identified high-speed shooting time. The high-speed shooting time may be already set by a designer and/or a user, or may be set based on at least one of a physical size of the selected point of interest or a time during which a motion of the external object is detected through the selected point of interest.

Referring to FIG. 10A, the processor 120 may identify that the high-speed shooting time pre-set by the user regarding a point of interest 1001 is 00:04:00 (4 seconds), and may obtain the plurality of second images according to the second frame rate for the identified time, 00:04:00 (1003).

Referring to FIG. 10B, when an external object is detected through a point of interest 1023 whose physical size is relatively small among two points of interest 1021 and 1023 having different physical sizes, the processor 120 may determine the high-speed shooting time to a first time (e.g., about 0.1 second) shorter than a designated time, and may obtain the plurality of second images according to the second frame rate for the first time. When an external object is detected through the point of interest 1021 whose physical size is relatively large, the processor 120 may determine the high-speed shooting time to a second time (e.g., about 0.3 second) longer than the designated time, and may obtain the plurality of second images according to the second frame rate for the second time.

In operation 713, the electronic device may re-change the shooting rate to the first frame rate and may shoot a moving image. The processor 120 may obtain the plurality of second images according to the second frame rate for the high-speed shooting time, and then, may control the camera module 180 to obtain the plurality of first images according to the first frame rate.

The electronic device (may determine whether an automatic shooting end event occurs in operation 715. The processor 120 may determine whether the automatic shooting end event occurs while obtaining the plurality of first images according to the first frame rate. For example, when a user input to request end of shooting is detected, the processor 120 may determine that the automatic shooting end event occurs. In another example, when a designated shooting time elapses from the start time of the automatic shooting, the processor 120 may determine that the automatic shooting end event occurs. In still another example, when high-speed moving image shooting is performed with respect to all of the set points of interest, the processor 120 may determine that the automatic shooting end event occurs. In another example, when high-speed moving image shooting is performed as many times as the designated number of times of detection of each of all of the set points of interest, the processor 120 may determine that the automatic shooting end event occurs. In another example, when a motion of at least one external object is detected at an end position of a subject movement path, the processor 120 may determine that the automatic shooting end event occurs.

The processor 120 may detect the automatic shooting end event while monitoring whether at least one external moving object is detected through the selected at least one point of interest. For example, when the processor detects a user input to request end of shooting while monitoring the selected at least one point of interest, the processor 120 may determine that the automatic shooting end event occurs. In another example, when an external moving object is not detected through the selected at least one point of interest for a designated time, the processor 120 may determine that the automatic shooting end event occurs.

When the automatic shooting end event is not detected, the processor 120 may resume operation 707. The processor 120 may select at least one point of interest. At least one point of interest may be selected based on at least one of a pre-set monitoring order, a monitoring method, or the number of times of detection of at least one point of interest. When at least one external moving object is detected through the previously selected point of interest and high-speed shooting is performed, the processor 120 may determine that detection regarding the previously selected point of interest is performed one time. The processor 120 may select at least one point of interest based on the monitoring order of the previously selected point of interest, the monitoring method of the previously selected point of interest, the number of times of detection of the previously selected point of interest, a monitoring order of at least one other point of interest, a monitoring method of at least one other point of interest, or the number of times of detection of at least one other point of interest.

The selected at least one point of interest may be the previously selected point of interest, or may be a different point of interest. For example, when the monitoring order of the previously selected point of interest 903 is 1 as shown in FIG. 9A, the processor 120 may select the point of interest 905 having the next monitoring order, 2. In another example, when the monitoring order of the previously selected point of interest 911 is 2 as shown in FIG. 9B, the processor 120 may select the point of interest 913 having the next monitoring order, 3. In another example, as shown in FIG. 9C, when at least one external moving object is detected through one point of interest 921 in the state where the two points of interest 921, 923 are previously selected due to the alternating detection method, the processor 120 may select the other point of interest 923. In another example, as shown in FIG. 9D, when the previously selected point of interest 931 is detected one time in the state where the monitoring order of the previously selected point of interest 931 is 1 and the number of times of detection is set to 2, the processor 120 may re-select the previously selected point of interest 931. In another example, as shown in FIG. 9E, when all of the three points of interest 941, 943, 945 are previously selected and at least one external object is detected through one point of interest 941 among these, the processor 120 may re-select the three points of interest 941, 943, 945 since the number of times of detection of each of the three points of interest 941, 943, 945 is smaller than N.

FIG. 7 described above depicts that at least one external moving object is detected and moving image shooting is performed according to the first, second, or third frame rate for convenience of explanation. However, other designated conditions may be detected and moving image shooting may be performed according to the first, second, or third frame rate. For example, a designated color, a designated image (e.g., a face image, an image of a smiling face), a designated shape (e.g., an animal shape, a person shape, a shape of a thing), or a designated type of object may be detected, and moving image shooting may be performed according to the first, second, or third frame rate.

Figure 11:
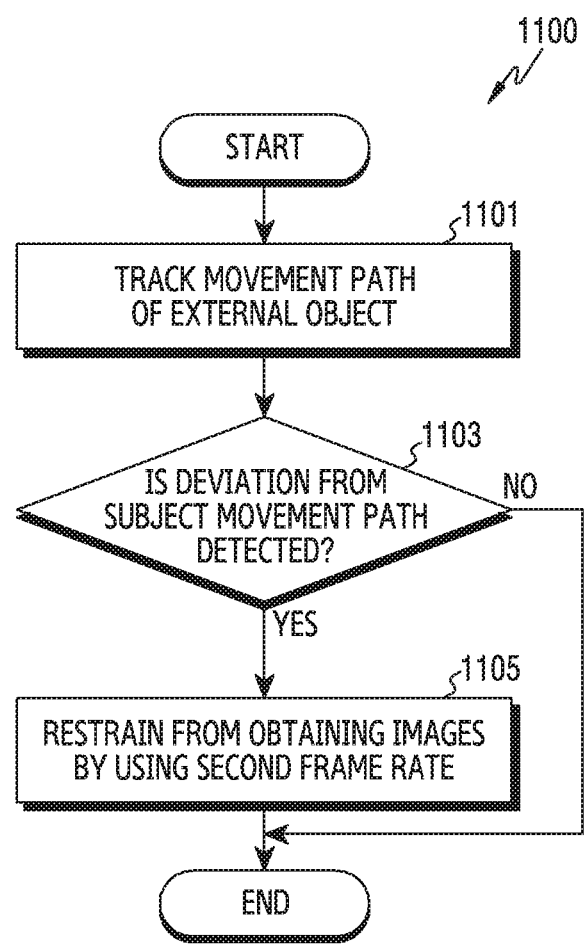
FIG. 11 is a flowchart for performing high-speed moving image shooting based on a movement path of an external object in an electronic device according to an embodiment of the disclosure.

FIG. 11 is a flowchart 1100 for performing high-speed moving image shooting based on a movement path of an external object in an electronic device according to an embodiment of the disclosure.

Operations of FIG. 11 described hereinbelow may be at least a part of the detailed operations of operation 705 or 713 of FIG. 7. In the following description, the respective operations may be performed in sequence but may not necessarily be performed in sequence. For example, the order of the operations may be changed or at least two operations may be performed in parallel. The electronic device may be the electronic device 101 of FIG. 1. Some operations of FIG. 11 will be described with reference to FIG. 12.

Figure 12:
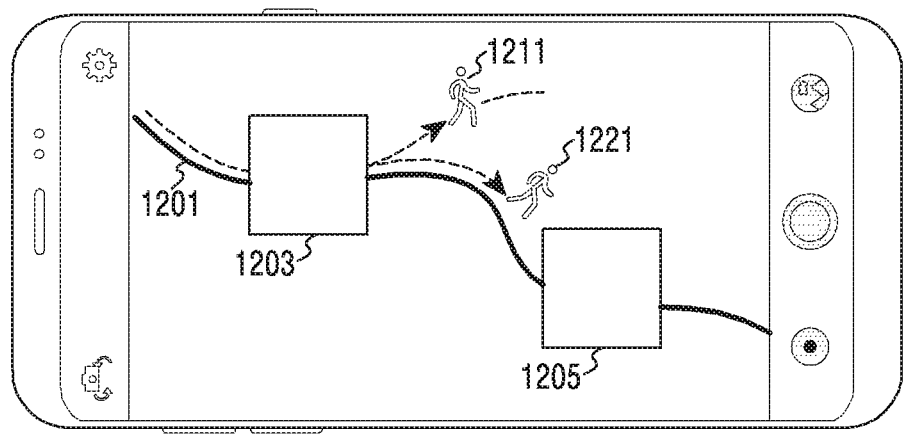
FIG. 12 is a view illustrating an example of performing high-speed moving image shooting based on a movement path of an external object in an electronic device according to an embodiment of the disclosure.

FIG. 12 is a view illustrating an example of performing high-speed moving image shooting based on a movement path of an external object in an electronic device according to an embodiment of the disclosure.

Referring to FIG. 11, in operation 1101, the electronic device (e.g., the processor 120 of FIG. 1) may track a movement path of at least one external object. The processor 120 may track the movement path of the at least one external object by using at least a part of the plurality of first images obtained according to the first frame rate. For example, the processor 120 may track the position of the at least one external object by using at least a part of the obtained plurality of first images while obtaining the plurality of first images according to the first frame rate.

The electronic device may detect whether the external object deviates from a designated subject movement path in operation 1103. The processor 120 may determine whether the external object deviates from the designated subject movement path by comparing the tracked movement path or movement position of the external object and the designated subject movement path. When a difference between the tracked movement position of the external object and the designated subject movement path falls within a threshold range, the processor 120 may determine that the external object is positioned on the designated subject movement path. When the difference between the tracked movement position of the external object and the designated subject movement path does not fall within the threshold range, the processor 120 may determine that the external object deviates from the designated subject movement path.

When the external object does not deviate from the subject movement path, the electronic device may perform operation 707 in FIG. 7. When the difference between the movement position of the external object and the designated subject movement path falls within the threshold range, the processor 120 may monitor at least one point of interest and may perform high-speed moving image shooting to obtain the plurality of second images according to the second frame rate higher than the first frame rate. For example, when a movement position 1221 of an external object is positioned within a threshold range from a designated subject movement path 1201 as shown in FIG. 12, the processor 120 may monitor a point of interest 1203 of the next order among the plurality of points of interest 1203 and 1205, and may obtain the plurality of second images according to the second frame rate. When the difference between the movement position of the external object and the designated subject movement path falls within the threshold range, and an external moving object is not detected through at least one point of interest, the processor 120 may obtain the plurality of first images according to the first frame rate. For example, when the external object does not correspond to at least one point of interest and exists on a position 1221 falling within the threshold range from the designated subject movement path, the processor 120 may obtain the plurality of first images according to the first frame rate.

When the external object deviates from the subject movement path, the electronic device may be restrained from obtaining images by using other frame rates in operation 1105. When the difference between the movement position of the external object and the designated subject movement path does not fall within the threshold range, the processor 120 may be restrained from obtaining the plurality of second images according to the second frame rate. For example, when the movement position 1211 of the external object does not fall within the threshold range from the designated subject movement path 1201 as shown in FIG. 12, the processor 120 may control not to perform high-speed moving image shooting according to the second frame rate.

When the external object deviates from the subject movement path, the processor 120 may finish the moving image shooting operation of the default rate to obtain the plurality of first images according to the first frame rate. When the external object deviates from the subject movement path, the processor 120 may obtain the plurality of first images according to the first frame rate before a user's end request is detected. The processor 120 may finish the operation of obtaining the plurality of first images according to the first frame rate in response to the user's end request being detected.

In the above-described example, the electronic device tracks the movement path or movement position of the external object, and determines whether the external object deviates from the designated movement path. The processor 120 of the electronic device may continue monitoring a designated movement path and whether an external moving object within a threshold range from the designated movement path is detected, and may determine whether the external object deviates from the designated movement path by using the result of monitoring. The processor 120 of the electronic device may monitor whether an external object moving within a part of the designated movement path is detected, and may determine whether the external object deviates from the designated movement path by using the result of monitoring.

In the above-described example, the electronic device (e.g., the electronic device 101 of FIG. 1) detects that the first designated condition is satisfied through at least one point of interest, and obtains a plurality of images according to the second frame rate. However, the electronic device 101 may obtain the plurality of images according to the second frame rate based on at least one of a voice, a gesture, a force touch, a touch, or other sensor data representing an intent to shoot.

A method of an electronic device (e.g., the electronic device 101 of FIG. 1) may include setting a first point of interest and a second point of interest related to a moving image to be generated by using at least one camera; obtaining a plurality of first images according to a first frame rate by using the at least one camera; identifying, through the first point of interest and the second point of interest by using at least a part of the plurality of first images, at least one external object that is being moved; in response to a motion of the at least one external object through the first point of interest, obtaining a plurality of second images regarding the at least one external object according to a second frame rate higher than the first frame rate by using the at least one camera; in response to a motion of the at least one external object through the second point of interest, obtaining a plurality of third images regarding the at least one external object according to the second frame rate or a third frame rate higher than the first frame rate by using the at least one camera; and, as a part of the moving image, generating the moving image including a first section generated by using at least a part of the plurality of first images, a second section generated by using the plurality of second images, and a third section generated by using the plurality of third images.

According to various embodiments of the present disclosure, identifying the at least one external object through the first point of interest and the second point of interest may include identifying a path which is set in relation to the first point of interest and the second point of interest; and identifying the at least one external object through the first point of interest and the second point of interest, based on orders of the first point of interest and the second point of interest according to the set path.

According to various embodiments of the present disclosure, the method may further include completing shooting of the moving image based on the orders or the set path.

According to various embodiments of the present disclosure, the method may further include: monitoring a motion path of the at least one external object; and determining whether to generate the first section or the second section based on comparison of the motion path of the at least one external object and the set path.

According to various embodiments of the present disclosure, determining whether to generate the first section or the second section may include, when the at least one external object is positioned within a threshold range from a start point of the set path, determining to generate the first section; and, when the at least one external object is positioned out of the threshold range from the set path, restraining from generating at least one of the second section and the third section.

According to various embodiments of the present disclosure, identifying the at least one external object through the first point of interest and the second point of interest may include identifying at least one of a monitoring order or a monitoring method regarding the first point of interest and the second point of interest, or a number of times of detection of an external object; selecting at least one of the first point of interest and the second point of interest, based on at least one of the monitoring order, the monitoring method, or the number of times of detection of the external object; and identifying the at least one external object through the selected at least one point of interest.

According to various embodiments of the present disclosure, the at least one external object may include a first external object and a second external object, and identifying the at least one external object through the first point of interest and the second point of interest may include detecting a motion of the first external object through the first point of interest; and detecting a motion of the second external object through the second point of interest.

According to various embodiments of the present disclosure, obtaining the plurality of second images by using the at least one camera may include: determining a shooting time regarding the first point of interest; and obtaining the plurality of second images regarding the at least one external object according to the second frame rate for the determined shooting time.

According to various embodiments of the present disclosure, the shooting time may be determined based on at least one of a user input, a size of the first point of interest, or a time during which a motion of the at least one external object is detected through the first point of interest.

According to various embodiments of the present disclosure, a motion of at least one external object is automatically detected based on at least one point of interest, and is shot at high speed in the electronic device, and accordingly, user convenience in high-speed shooting can be enhanced.

According to various embodiments of the present disclosure, a user is allowed to freely set and/or adjust a condition regarding high-speed shooting through at least one point of interest in the electronic device, such that the user can perform high-speed shooting at a time when the user actually wishes to shoot.

The electronic device according to various embodiments of the present disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one camera;
   a memory; and
   a processor,
   wherein the processor is configured to:
      set a first point of interest and a second point of interest related to a moving image to be generated by using the at least one camera, the first point of interest and the second point of interest being separated by a path which at least one external object is to be moved, the path separating the first point of interest and the second point of interest being set by the processor prior to movement of the at least one external object through a region of the first point of interest,
      obtain a plurality of first images according to a first frame rate by using the at least one camera,
      identify, through the first point of interest and the second point of interest by using at least a part of the plurality of first images, the at least one external object that is moving,
      in response to a motion of the at least one external object through the first point of interest, obtain a plurality of second images regarding the at least one external object according to a second frame rate higher than the first frame rate by using the at least one camera,
      in response to a motion of the at least one external object through the second point of interest, obtain a plurality of third images regarding the at least one external object according to the second frame rate or a third frame rate higher than the first frame rate by using the at least one camera, and
      generate, as a part of the moving image, the moving image comprising at least one of a first section generated by using at least a part of the plurality of first images, a second section generated by using the plurality of second images, or a third section generated by using the plurality of third images.

2. The electronic device of claim 1, wherein the processor is further configured to:
identify the path set in relation to the first point of interest and the second point of interest, and
identify the at least one external object through the first point of interest and the second point of interest based on orders of the first point of interest and the second point of interest according to the path.

3. The electronic device of claim 2, wherein the processor is further configured to complete shooting of the moving image based on the orders or the path.

4. The electronic device of claim 2, wherein the processor is further configured to:
monitor a motion path of the at least one external object, and
determine whether to generate the first section or the second section based on a comparison of the motion path of the at least one external object and the path.

5. The electronic device of claim 4, wherein the processor is further configured to, in response to the at least one external object being positioned within a threshold range from a start point of the path:
determine to generate the first section, and
obtain the plurality of first images according to the first frame rate.

6. The electronic device of claim 4, wherein the processor is further configured to, in response to the at least one external object being positioned out of a threshold range from the path, restrain from generating at least one of the second section or the third section.

7. The electronic device of claim 1, wherein the processor is further configured to:
identify at least one of a monitoring order or a monitoring method regarding the first point of interest and the second point of interest, or a number of times of detection of an external object,
select one or more of the first point of interest and the second point of interest based on at least one of the monitoring order, the monitoring method, or the number of times of detection of the external object, and
identify the at least one external object through the selected one or more of the first point of interest and the second point of interest.

8. The electronic device of claim 1,
wherein the at least one external object comprises a first external object and a second external object, and
wherein the processor is further configured to:
detect a motion of the first external object through the first point of interest, and
detect a motion of the second external object through the second point of interest.

9. The electronic device of claim 1, wherein the processor is further configured to:
determine a shooting time regarding the first point of interest, and
obtain the plurality of second images regarding the at least one external object according to the second frame rate for the determined shooting time.

10. The electronic device of claim 9, wherein the shooting time is determined based on at least one of a user input, a size of the first point of interest, or a time during which a motion of the at least one external object is detected through the first point of interest.

11. The electronic device of claim 1,
wherein the at least one camera comprises a first camera and a second camera, the first camera having a first angle of view, the second camera having a second angle of view larger than or equal to the first angle of view, and
wherein the processor is further configured to:
set the first point of interest and the second point of interest in a preview region of the first camera having the first angle of view,
set a moving image shooting trigger region in a preview region of the second camera having the second angle of view, and
in response to the at least one external object being detected through the moving image shooting trigger region, control the first camera to obtain the plurality of first images according to the first frame rate.

12. A method of an electronic device, the method comprising:
setting a first point of interest and a second point of interest related to a moving image to be generated by using at least one camera, the first point of interest and the second point of interest being separated by a path which at least one external object is to be moved, the path separating the first point of interest and the second point of interest being set prior to movement of the at least one external object through a region of the first point of interest;
obtaining a plurality of first images according to a first frame rate by using the at least one camera;
identifying, through the first point of interest and the second point of interest by using at least a part of the plurality of first images, the at least one external object that is moving;
in response to a motion of the at least one external object through the first point of interest, obtaining a plurality of second images regarding the at least one external object according to a second frame rate higher than the first frame rate by using the at least one camera;
in response to a motion of the at least one external object through the second point of interest, obtaining a plurality of third images regarding the at least one external object according to the second frame rate or a third frame rate higher than the first frame rate by using the at least one camera; and
generating, as a part of the moving image, the moving image comprising at least one of a first section generated by using at least a part of the plurality of first images, a second section generated by using the plurality of second images, or a third section generated by using the plurality of third images.

13. The method of claim 12, wherein the identifying of the at least one external object through the first point of interest and the second point of interest comprises:
identifying the path set in relation to the first point of interest and the second point of interest; and
identifying the at least one external object through the first point of interest and the second point of interest based on orders of the first point of interest and the second point of interest according to the path.

14. The method of claim 13, further comprising completing shooting of the moving image based on the orders or the path.

15. The method of claim 13, further comprising:
monitoring a motion path of the at least one external object; and determining whether to generate the first section or the second section based on a comparison of the motion path of the at least one external object and the path.

16. The method of claim 15, wherein the determining of whether to generate the first section or the second section comprises:
   in response to the at least one external object being positioned within a threshold range from a start point of the path, determining to generate the first section; and
   in response to the at least one external object being positioned out of the threshold range from the path, restraining from generating at least one of the second section or the third section.

17. The method of claim 12, wherein the identifying of the at least one external object through the first point of interest and the second point of interest comprises:
   identifying at least one of a monitoring order or a monitoring method regarding the first point of interest and the second point of interest, or a number of times of detection of an external object;
   selecting one or more of the first point of interest and the second point of interest based on at least one of the monitoring order, the monitoring method, or the number of times of detection of the external object; and
   identifying the at least one external object through the selected one or more of the first point of interest and the second point of interest.

18. The method of claim 12,
   wherein the at least one external object comprises a first external object and a second external object, and
   wherein the identifying of the at least one external object through the first point of interest and the second point of interest comprises:
      detecting a motion of the first external object through the first point of interest; and
      detecting a motion of the second external object through the second point of interest.

19. The method of claim 12, wherein the obtaining of the plurality of second images by using the at least one camera comprises:
   determining a shooting time regarding the first point of interest; and
   obtaining the plurality of second images regarding the at least one external object according to the second frame rate for the determined shooting time.

20. The method of claim 19, wherein the shooting time is determined based on at least one of a user input, a size of the first point of interest, or a time during which a motion of the at least one external object is detected through the first point of interest.

* * * * *